(12) United States Patent
O'Neill

(10) Patent No.: US 8,457,041 B2
(45) Date of Patent: Jun. 4, 2013

(54) METHODS AND APPARATUS FOR USE IN A COMMUNICATION SYSTEM

(75) Inventor: Alan William O'Neill, Henley Beach (AU)

(73) Assignee: QUALCOMM Incorporated, San Diego, CA (US)

( * ) Notice: Subject to any disclaimer, the term of this patent is extended or adjusted under 35 U.S.C. 154(b) by 1061 days.

(21) Appl. No.: 11/967,398

(22) Filed: Dec. 31, 2007

(65) Prior Publication Data
US 2008/0186908 A1 Aug. 7, 2008

Related U.S. Application Data

(60) Provisional application No. 60/883,039, filed on Dec. 31, 2006.

(51) Int. Cl.
*H04W 4/00* (2009.01)

(52) U.S. Cl.
USPC .......................... 370/328; 455/433

(58) Field of Classification Search
None
See application file for complete search history.

(56) References Cited

U.S. PATENT DOCUMENTS

| | | | |
|---|---|---|---|
| 6,195,705 B1 | 2/2001 | Leung | |
| 6,445,922 B1* | 9/2002 | Hiller et al. | 455/433 |
| 6,707,809 B1* | 3/2004 | Warrier et al. | 370/351 |
| 6,738,362 B1 | 5/2004 | Xu et al. | |
| 6,751,672 B1* | 6/2004 | Khalil et al. | 709/230 |
| 6,795,705 B1* | 9/2004 | Warrier et al. | 455/435.1 |
| 7,080,151 B1* | 7/2006 | Borella et al. | 709/230 |
| 7,349,328 B2 | 3/2008 | Watanabe | |
| 7,366,147 B2 | 4/2008 | O'neill | |
| 2001/0021175 A1 | 9/2001 | Haverinen | |
| 2003/0045287 A1* | 3/2003 | Taniguchi | 455/433 |
| 2004/0052238 A1* | 3/2004 | Borella et al. | 370/349 |
| 2004/0081086 A1 | 4/2004 | Hippelainen et al. | |

(Continued)

FOREIGN PATENT DOCUMENTS

| | | |
|---|---|---|
| CN | 1430856 A | 7/2003 |
| EP | 1548990 | 6/2005 |

(Continued)

OTHER PUBLICATIONS

International Search Report and Written Opinion—PCT/US2007/089215, International Search Authority—European Patent Office—Jun. 30, 2008.

(Continued)

*Primary Examiner* — Bunjob Jaroenchonwanit
(74) *Attorney, Agent, or Firm* — Sam Talpalatsky; Nicholas J. Pauley; Joseph Agusta

(57) ABSTRACT

Various methods and apparatus are directed to, among other things, an access node which is used in providing enhanced functionality and fault tolerance in a system which distributes home agent functionality between a home agent control node and a tunneling node, referred to herein as a home agent tunneling node, which performs packet forwarding under direction of the home agent control node. The distributed home agent approach is enhanced in some embodiments to provide redundancy of home agent control nodes and/or home agent tunneling nodes. Thus, in accordance with some embodiments if a home agent control node fails, the secondary home agent control node can take over the home agent control function. Various embodiments describe various methods, apparatus, and/or messages in addition to system configurations, which can be used to maintain primary and secondary home agent control and facilitate a rapid transfer of functions between primary and secondary nodes.

47 Claims, 20 Drawing Sheets

U.S. PATENT DOCUMENTS

| | | | |
|---|---|---|---|
| 2004/0100951 A1* | 5/2004 | O'neill | 370/389 |
| 2005/0101321 A1* | 5/2005 | Ikeda et al. | 455/435.1 |
| 2005/0136924 A1* | 6/2005 | Adrangi et al. | 455/435.1 |
| 2005/0188065 A1* | 8/2005 | O'Rourke et al. | 709/223 |
| 2005/0243766 A1 | 11/2005 | Tsirtsis et al. | |
| 2005/0272438 A1* | 12/2005 | Holur et al. | 455/452.2 |
| 2006/0104247 A1* | 5/2006 | Dommety et al. | 370/338 |
| 2006/0133316 A1 | 6/2006 | Jagana et al. | |
| 2006/0285525 A1* | 12/2006 | Sastry | 370/338 |
| 2007/0104146 A1* | 5/2007 | Hossain et al. | 370/331 |
| 2007/0171886 A1* | 7/2007 | Lewis et al. | 370/338 |
| 2008/0212576 A1 | 9/2008 | O'Neill | |
| 2008/0291869 A1* | 11/2008 | Warrrier et al. | 370/328 |
| 2010/0316018 A1* | 12/2010 | Turanyi et al. | 370/331 |

FOREIGN PATENT DOCUMENTS

| | | |
|---|---|---|
| JP | 2004513581 A | 4/2004 |
| JP | 2005530426 A | 10/2005 |
| JP | 2006203581 A | 8/2006 |
| TW | I228364 | 2/2005 |
| TW | I228893 | 3/2005 |
| TW | I244349 | 11/2005 |
| WO | WO0237873 A2 | 5/2002 |
| WO | WO2005112354 A1 | 11/2005 |

OTHER PUBLICATIONS

Taiwan Search Report—TW096151517—TIPO—Feb. 24, 2012.

* cited by examiner

METHODS AND APPARATUS FOR USE IN A COMMUNICATION SYSTEM

RELATED APPLICATIONS

The present application claims the benefit of U.S. Provisional Patent Application Ser. No. 60/883,039 filed on Dec. 31, 2006, titled "COMMUNICATIONS METHODS, SYSTEM AND APPARATUS", which is hereby expressly incorporated by reference and which is assigned to the assignee hereof.

FIELD

Various embodiments are directed to communications methods and apparatus and, more particularly, to methods and apparatus for controlling packet forwarding using multiple mobility control nodes.

BACKGROUND

Mobile IP (MIP) is described in a number of documents developed in the IETF (www.ietf.org). MIP provides for mobility management for a mobile node (MN) Home address (HoA) by tunneling packets at a Home Agent (HA) towards/from a MN Care of Address (CoA), at which the MN HoA is routable. MIP signaling between the MN and the HA, maintains the MN CoA/MN HoA binding at the HA, and updates it to each new CoA value as the MN moves between Access Routers, and hence across the routing topology.

The MIP HA acts as both the end point for MIP signaling and also as the endpoint for MIP tunnel forwarding. The HA also issues routing adverts for the HoA prefixes at that HA, from which MNs are allocated HoAs. The MIP HA must have a security association with each MN, and also with any Foreign Agent through which the signaling traverses. This is to ensure that binding changes can only be made by authorized MIP nodes. The end result is typically a HA router platform with significant forwarding, mobility signaling and security processing responsibilities. The HA also has timely visibility of the topological location and movement of the MN which can be useful for Location Based Services, and for presence management. However, the processing and publishing of such information to application services places additional significant burdens on HA nodes. A further problem with HAs is that from a security and management perspective they should be ideally located behind a firewall in the applications server farm of the operator but this causes high volume, low value traffic to trombone through the firewall twice to visit the HA and be onward forwarded to the MN.

An improved MIP HA architecture decomposes the HA functions, to separate and distribute the MIP signaling and tunneling end-points. The HA Control Node (HACN) manages the mobility signaling with the MN and FA whilst one or more HA Tunneling Nodes (HATNs) provide forwarding for packets towards the HoA of the MN. In such an approach multiple HATNs may be operated under the control of a single HACN.

However, even when using multiple HATNs, the failure of the HACN still renders all MNs that undertake mobility signaling via that HACN unable to update their mobility location while it may still be possible for each HATN to forward packets correctly to MNs that remain at the same location. Therefore whether a traditional HA or a decomposed HA (HACN/HATN) is used for mobility management, the failure of the HA/HACN results in significant problems.

A redundant pair of conventional HAs, synchronised with Virtual Router Redundancy Protocol (VRRP), is generally considered at the present time to be the optimal deployment configuration for an IP mobility domain, with any HA failure then being hidden from the MN/FA by the synchronization protocol with the redundant HA. As the need grows to integrate mobility events with value-adding processes, including external application servers, this centralized (hot standby) architecture becomes more and more of a bottleneck as the amount of state to be synchronized grows. Locating the two HAs in the same location renders them vulnerable to geographical/environmental failures (weather, power, attack, flood etc). In addition, the synchronization protocol performs increasingly poorly as the HAs are moved apart (increasing signaling delay) because the bindings and other state in each virtual HA become desynchronized.

The use of multiple physical HAs, that do not require synchronization, is problematic because the HA manages address allocation and forwarding and so a change of HA forces a change in the MN HoA creating major disruption to ongoing sessions. In addition, the HA address and HoA is known by the MN and the FA, and so a change in HA is exposed to the MN and relies on the MN acting promptly to detect the failed HA and then move across to the spare HA. No known solution exists for that spare HA being able to provide forwarding for the HoA that was being used at the failed HA. In addition, relying on the MN to perform the recovery from the failed HA is expensive on the air-link, slow and means that customers are overly exposed to operator failures and operators rely on terminal software for the timeliness of that recovery.

In view of the above discussion, it should be appreciated that there is a need for improved methods of providing packet forwarding control functions and/or packet forwarding functions, e.g., HA type functions, in a manner that provides both fault tolerance and/or avoids many of the problems/risks associated with locating two home agents in close proximity while avoiding some or many of the snchronization and control issues associated with using two conventional HAs that are located at distances from one another.

SUMMARY

Various methods and apparatus are directed to, among other things, an access node which is used in providing enhanced functionality and fault tolerance in a system which distributes home agent functionality between a home agent control node and a tunneling node, referred to herein as a home agent tunneling node, which performs packet forwarding under direction of the home agent control node. The distributed home agent approach is enhanced in accordance with the various embodiments to provide redundancy in terms of home agent control nodes and/or home agent tunneling nodes. Not all aspects discussed below are used in all embodiments and various alternative approaches are described in several instances.

In accordance with some aspects if a home agent control node fails, the secondary home agent control node can take over the home agent control function. While introducing redundancy may appear to be a simple matter, to avoid the loss of packets, in many but not necessarily all applications, there is a need to be able to switch between the primary and secondary home agent control nodes in a short amount of time. Various embodiments describe various methods, apparatus, nodes and/or messages in addition to system configurations, which can be used to maintain primary and secondary home agent control in a condition, e.g., state of operation, which facilitates the rapid transferring of functions between primary and secondary nodes. Many of the features of the novel embodiments are directed to messages and methods of signaling which can be used to update information stored in the primary and second home agent control nodes, e.g., binding information which can be used for address resolution and to support packet routing. In addition, various methods are directed to methods of signaling which mode, primary or secondary, a particular home agent control node is to operate at a particular point in time. The messaging and control method of various embodiments provide an efficient way of updating/controlling the home agent control nodes state of operation as well as the information stored in these nodes which is used to provide home agent functionality to individual nodes. Novel fault detection techniques are also described which can be used to trigger a switch from a primary to a secondary node. Switching from a primary to a secondary node may cause the status of the nodes to be reversed, e.g., with the node which was operating as a secondary HA control node becoming the primary HA control node and the node which was serving as the secondary HA control node becoming the primary HA control node.

It should be appreciated that methods and apparatus for providing home agent type functionality through the use of multiple distributed packet forwarding control nodes and multiple packet forwarding node are described. The methods and apparatus of various embodiments provide redundancy of both the packet forwarding control and actual packet forwarding operations while allowing the redundant nodes to be located at different physical locations thereby improving system reliability and fault tolerance.

Thus, among other things, this application is directed to methods and apparatus for using multiple home agent control nodes (HACNs) to provide redundancy and/or control in a system having one or multiple Home agent tunneling nodes (HATNs) are described. In some embodiments HACNs are used to control packet forwarding, e.g., to a roaming node, by controlling a HATN to forward packets to the node, e.g., in a visited network.

The methods and apparatus will be described primarily for the case of the MIP based system, but are applicable and can be used to provide the equivalent or similar control and forwarding functions in a 3GPP/CDMA2000 systems and/or other systems having similar needs. Such systems can be implemented with the same or similar signaling and tunneling functions described herein being implemented via one or more of the following system elements or future equivalents: MSC, SGSN, GGSN, PDSN, RNC, BS and MT nodes via MIP or GTP based tunneling and support signaling. Various features and methods described herein can be mapped and implemented directly using the nodes which are equivalent or similar to those described in the examples included herein, which are found in 3GPP and CDMA2000 systems and their derivatives.

In various embodiments multiple HACNs are located at Points of presence (POPs) throughout the operators network, and share access to a common HA Database Function (HADF) that may be located in one of the HACNs or in a separate HA Database Node (HADN). The HADF holds information on amongst other things MNs, HACN addresses, HATN addresses, Home Address prefixes, prefix assignments to HATNs, Home Address assignments to MNs, and HATN bindings (i.e. mappings between MN HoAs and MN forwarding addresses). It specifically contains information on the HACNs and HATNs that support a specific HoA prefix in each part of the operators network. HATNs are allocated prefixes out of the HADF, and any assigned HACN can make adjustments to the bindings at a HATN via the HACN-HATN protocol. The AAA system is preferentially used for distributing a list of HACNs, HATNs and associated HoA prefixes, to each Access Node, located for example at the Basestation, which is refreshed on a regular basis so that HACNs and HATNs that are out of service, can be removed from the list, and changes in HACN/HATN/prefix mappings undertaken. Note that the HACNs and HATNs for a particular prefix is typically only distributed to an Access Node when a MN under that prefix exists at that Access Node.

Each MN is allocated a HoA address, preferentially by the AAA system, and an associated primary and secondary HACN can be assigned. This ensures that HoA allocation state is not tied to a specific HACN. The assigned HoA, and associated HACNs are passed to the MN in the first binding response by the Access Node. The FA caches the mappings between the HACNs and prefixes, and polices messages from the MN to ensure they comply with those mappings. As the MN moves around the infrastructure, the primary and secondary HACNs offered to the MN can change. This is because multiple topologically and geographically distributed HACNs are able to be the primary HACN for the same prefix, the result being that the MNs under the same prefix in a particular part of the network would have the same primary and secondary HACNs. The MN should first try the primary HACN advertised by an FA even if that means that the MN has to relocate from another HACN. If the MN uses the wrong HACN then the FA could replace the HACN value and return the new value in the binding response.

When a MN fails to get a response from the primary HACN to a binding update, then the MN needs to be in a position to take appropriate action. The failed response could be as a result of packet loss, or failures at the FA, HACN or HATNs. The probability of two concurrent HATNs failing is much less than the probability of a HACN failure, and the FA failure is quickly detected, and avoided by the MN. The probability of the failure being due to packet loss is highest and so the FA should retransmit the binding update message, marked with a retransmit flag, or some modified identifier, to the primary HACN after timer T1. T1 could be set to be significantly greater than (default 2.5 times) the normal round trip time via the HACN and the HATNs (RTT1). If both the initial and retransmitted binding update requests are not answered after timer T2 (i.e. default 6 times RTT1), then the MN redirects the binding update to the secondary HACN. It may be possible, and preferable, for this redirection to be handled by the FA, with the response to the binding update informing the MN of the HACN change.

In some embodiments, a strict ordering is generated by the MN for its binding. It is possible to have the FAs generate this order identifier to save air-link resources. A combination of one, two or three identifiers can be used to manage this ordering, the identifiers being generated at a number of different nodes. The binding updates are strictly ordered so that the FA, HACN, HADF and multiple HATNs can detect duplicates and retransmissions, and so they are never confused about which is the latest binding update that is associated with a specific MN HoA, and which HACN is managing a specific prefix at each HATN. This order identifier is carried in the messages via the FA to the HACN, through to the redundant HATNs, and then returned in the HATN responses back through the HACN to the MN. It is possible to return a different identifier as long as its value is a function of information in the received message and shared information between the nodes on the signaling path, so that the returned identifier can be verified for ordering and security purposes. The current HACN that is managing the current binding for a MN at a HATN may be displaced when another HACN updates that binding using an increased order identifier, or when a higher priority is indicated or when performance information indicates that a different HACN should be used.

Events at the HATN associated with a binding such as performance statistics, are reported to the current HACN or the spare HACN. In an exemplary embodiment, these events are not reported to the secondary HACN because a failed primary HACN will be bypassed by the MN, and the HATN will then inform the secondary HACN in its response. Each new binding update for a specific MN HoA acknowledges the events previously received from a HATN so that the HATN tracks successful reception and storage of these events at the HADF.

When a primary HACN for a specific HoA prefix fails, a large number of MNs under the affected HoA prefixes will normally lose their mobility management capability. These MNs will be in the same topological part of the network, and multiple MNs will likely be at the same secondary HACN, FAs and HATNs. This ensures that the failure mechanisms are efficient in terms of HADF, HACN, FA and HATN processing, messaging and state. The first binding update towards the failed primary HACN will inform the FA and then the HATNs of the primary failure, and the switch to the secondary HACN, The FA can then cache this failure information and immediately redirect all binding updates from MNs at that FA employing prefixes from that HACN, to the secondary HACN, and hence avoid timer T1, T2. This failure information will also be rapidly propagated to neighbouring Access Nodes as a result of hand-offs, and the associated state transfer between Access Nodes. Failure information will reach the HADF, and result in distribution of the HACN change (i.e. becoming the new primary) to the rest of the FAs in the infrastructure via the AAA messages. The secondary HACN learns of the primary HACN failure from the redirected binding update, and hence can start to accumulate local state associated with the affected HoA prefixes from the AAA and HADF. The affected HATN will also be informed of the primary HACN failure from the redirected binding update, and can cease transmitting information to the primary HACN and redirect messages to the secondary HACN for the affected HoA prefix.

Depending on the particular embodiment, HATNs can request changeover to another HACN, or the old or new LACN can direct the HATN to change to the new HACN as a result of specific messages or indirectly as a result of updated binding messages being received from a new HACN. The Access Node or the MN can direct binding information messages towards either the old or new HACN as a result of time or load based sharing, priority indications, or performance tracking of the HACNs. When changeover signaling is conducted via a separate HADN then the HADN passes messages between the two HACNs.

An exemplary method of operating an access node in a communications system including the access node, a first node, e.g., first HATN, a second node, e.g., first HACN, and a fourth node, e.g., second HACN, comprises: storing information indicating a mapping between a MN address and identifiers of the second and fourth nodes; receiving a binding update message including the MN address and a forwarding address, said forwarding address being used by said first node to forward packets including said MN address; and forwarding a portion of said message to the second node. An exemplary access node, in accordance with some embodiments, for use in a communications system including the access node, a first node, e.g., a first HATN, a second node, e.g., a first HACN, and a fourth node, e.g., a second HACN, comprises: a memory module storing information indicating a mapping between a MN address and identifiers of the second and fourth nodes; a binding update message processing module for processing received binding update messages including the MN address and a forwarding address, said forwarding address being used by said first node to forward packets including said MN address; and a module for forwarding a portion of said message to the second node.

The above described features are only a few of the many features and embodiments described in the present application and are not to be considered a summary of all the features or elements. Numerous additional features and embodiments are described in the detailed description which follows.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

DETAILED DESCRIPTION

Figure 1:
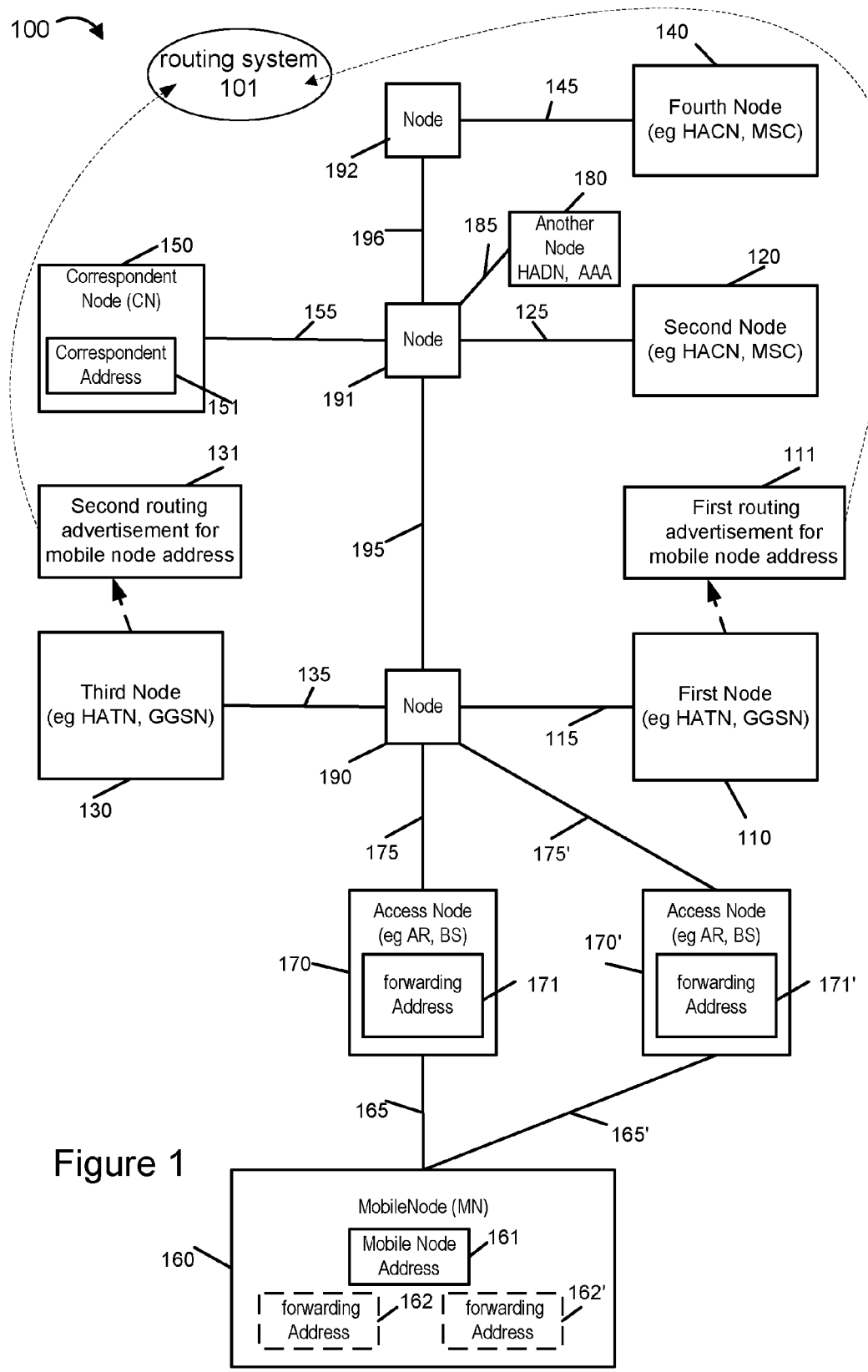
FIG. 1 shows an exemplary network illustrating exemplary elements of various embodiments.

FIG. 1 shows an exemplary network 100 illustrating elements of various embodiments. Mobile end node (MN) 160 is coupled to an access node 170, e.g., an Access router and or a Basestation, by link 165. Link 165 can be a fixed medium such as a cable, or a wireless medium such as is common in cellular systems. The Access Node 170, in some embodiments, contains a Foreign Agent or Attendant Agent in a Mobile IP based mobility management system. The Access Node 170 is coupled to a network node 190 via a link 175. Network node 190 is coupled to a network node 191 via link 195. The MN 160 can alternatively be coupled via link 165' to Access Node 170' which itself is coupled to node 190 via link 175'. Node 191 is further coupled to a network node 192 via link 196 and to Another Node 180 e.g., a HADN or AAA, via link 185. Network node 191 is coupled via link 155 to a Correspondent Node (CN) 150 which is also an end node. CN 150 may participate in the reception and transmission of IP packets in a communications session with the Mobile Node 160. The CN 150 has a Correspondent Address 151 whilst the MN 160 has a Mobile Node Address 161, which for the case of Mobile IP is also called the Home Address (HoA). In such sessions, packets sent from the MN 160 to the CN 150 have a source address equal to the MN address 161, and a destination address equal to a Correspondent Address 151 and visa versa for packets from the CN 150 to the MN 160. Coupled to the network node 190, via link 115, is a first node 110 which would typically be a HATN or GGSN. Optional third node 130, which would typically be an additional HATN or GGSN, is coupled to node 190 via link 135. The first node and the third node (110, 130) are both able to support packet forwarding for packets exchanged between the CN 150 and the MN 150. In support of that forwarding, the first node 110 injects a first routing advertisement 111 into the routing system 101 operating within the network 100, for an address prefix that includes the MN address 161. Similarly, the optional third node 130 injects a second routing advertisement 131 into the same routing system 101, for an address prefix that includes the MN address 161. Exemplary network 100 also includes a second node 120 and a fourth node 140. The second node 120 is, for example, a HACN or MSC which is coupled to network node 191 via link 125. Similarly, the fourth node 140 is an additional HACN or MSC which is coupled to the network node 192 via link 145. Each of the second and fourth nodes (120,140) are capable of acting as a signaling endpoint for mobility signaling from the MN 160 and from the AN 170.

The second and fourth nodes (120,140) are then able to update forwarding information in the first node 110, and the optional third node 130, with each new forwarding address 171 and/or 162 of the MN 160 so that packets arriving at the first and third nodes (110,130) that are destined for the MN address 161, from the CN address 151 can be forwarded towards the MN 160. The forwarding address 171 in the Access Node 171 can be an IP address or a link layer address, and in the case of MIP could specifically be a Foreign Agent Care of Address. The forwarding address 162 can be an IP address or a link layer address. In the case of MIP it could be the MN Colocated Care of Address or it could be the link-layer address of the MN when it is sharing a Foreign Agent Care of Address with other nodes.

Some of the network nodes run a routing protocol as part of the routing system 101 and the routing advertisements (111, 131) will be processed by the nodes performing the routing protocol to determine the next hop for packets containing the MN address 161 as for example a destination address. Said packets destined for the MN address will as a result be forwarded to either the first node 110 if only first routing message 111 is injected, or to one of the first and the third nodes (110,130) if both first and second routing advertisements (111,131) are injected. When a packet destined for the MN address arrives at one of the first and the third nodes (110, 130), it will be compared to the binding entries at the receiving node to identify the forwarding address 171 and/or 162 that is to be used to forward the packet towards the MN 160.

The MN 160 and/or the Access Node 170 perform mobility management signaling with the second node 120 and with the fourth node 140, to update the forwarding address(s) to be used for packets containing the MN address 161, such as those destined for the MN 160. The forwarding address depends on which of the Access Nodes 170, 171 to which the MN 160 is connected. When the MN 160 moves from Access Node 170 to Access Node 170' then the forwarding address changes from forwarding address 171 to forwarding address 171' whilst the forwarding address at the MN 160 changes from forwarding address 162 to forwarding address 162'. The MN 160 and the Access Node 170 therefore need to obtain updated forwarding addresses and to communicate at least one of these forwarding addresses (171', 162') to at least one of the second and fourth nodes (120, 140). At least one of said second and fourth nodes (120,140) need to then signal the new forwarding address (171', 162') to the first node 110, or to one of the first and third nodes (110,130) if both are able to provide forwarding for the MN address 161. If the second node 120 is being used to update said forwarding addresses (171,171', 162,162') and it is determined that the second node 120 is no longer able to update such forwarding addresses (171,171', 162,162') then the MN 160 and/or the Access node 170 can instead send the forwarding address update to the fourth node 140, and the fourth node 140 will then propagate the updated forwarding address (171,171',162,162') into at least one of the first and the third nodes (110,130). System 100 also includes another node 180, e.g., a HADN or AAA coupled to node 191 via link 185.

Figure 2:
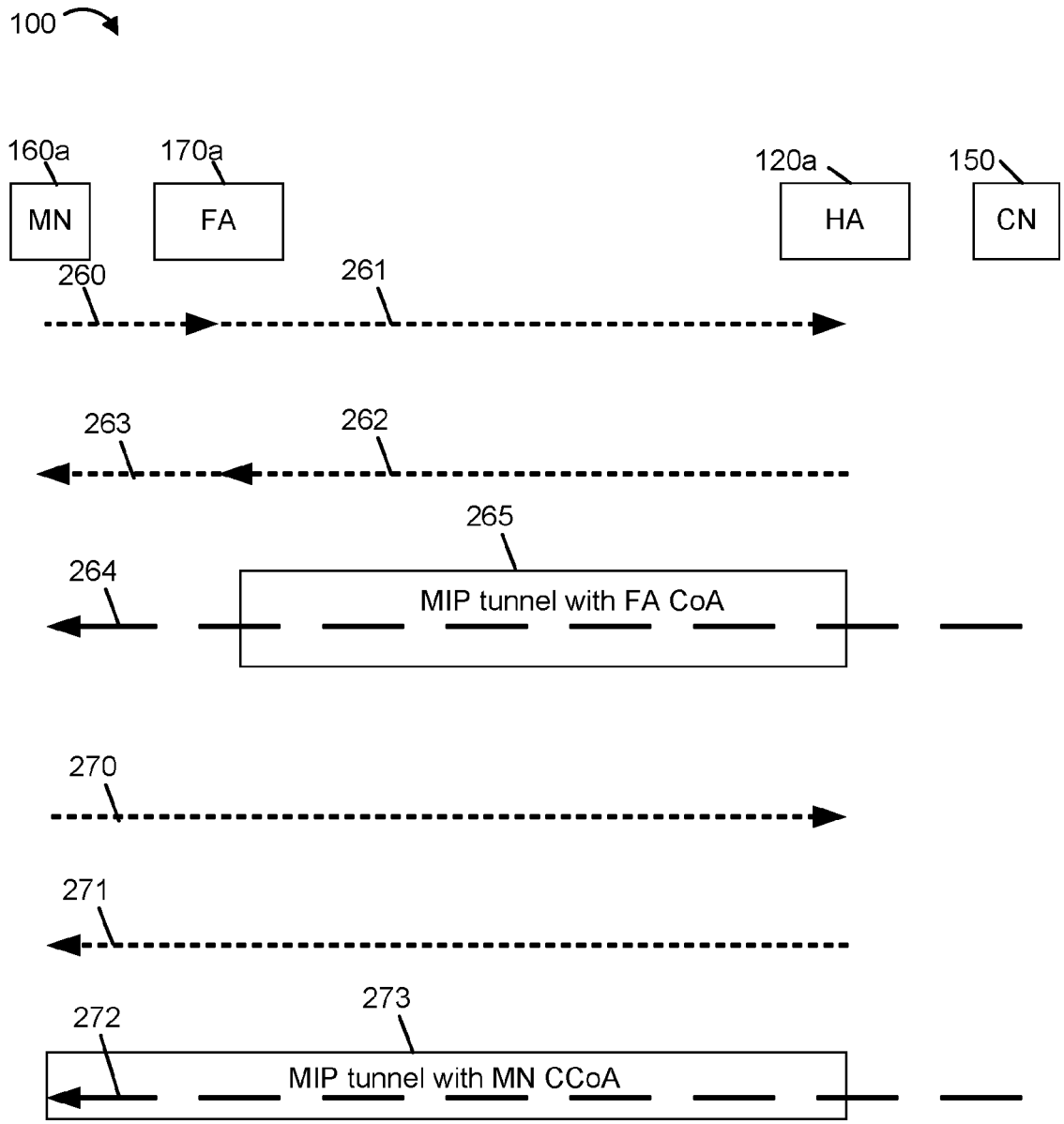
FIG. 2 shows prior art Mobile IP (MIP) signaling between a mobile node (MN), a foreign agent (FA) and a home agent (HA).

FIG. 2 shows in drawing 200 prior art Mobile IP signaling between a MN 160a, a FA 170a and a HA 120a. Message 260 is a MIP Registration Request (RREQ) message from the MN to the FA, whilst message 261 is a RREQ from the FA 170a to the HA 120a. This message flow can be used to register either a MN CCoA or a FA CoA into the HA 120a for the HoA of the MN 160a. The MIP Registration Reply (RREP) is from the HA 120a to the FA 170a as shown in message 262, which is forwarded to the MN 160a as message 263. This confirms the installation of the mobility binding into the HA 120a and FA 170a, between the MN HoA and the MN CoA. In the case of registering a FA CoA, packet flow 264 between a CN 150a and the MN HoA is received at the HA 120a, and then tunneled to the FA CoA in tunnel 265. MIP signaling can alternatively employ a RREQ message 270 from the MN 160a to the HA 120a, and a RREP from the HA 120a to the MN 160a, to install a MN CCoA into the binding at the HA 120a. Packet flow 272 shows a flow of packets between a CN 150a and the MN 160a, which when received at the HA 120a are tunneled to the MN CCoA using tunnel 273 according to the stored binding for the MN HoA. This binding can be installed using either the signaling messages 260, 261, 262 and 263, or alternatively messages 270 and 271.

Figure 3:
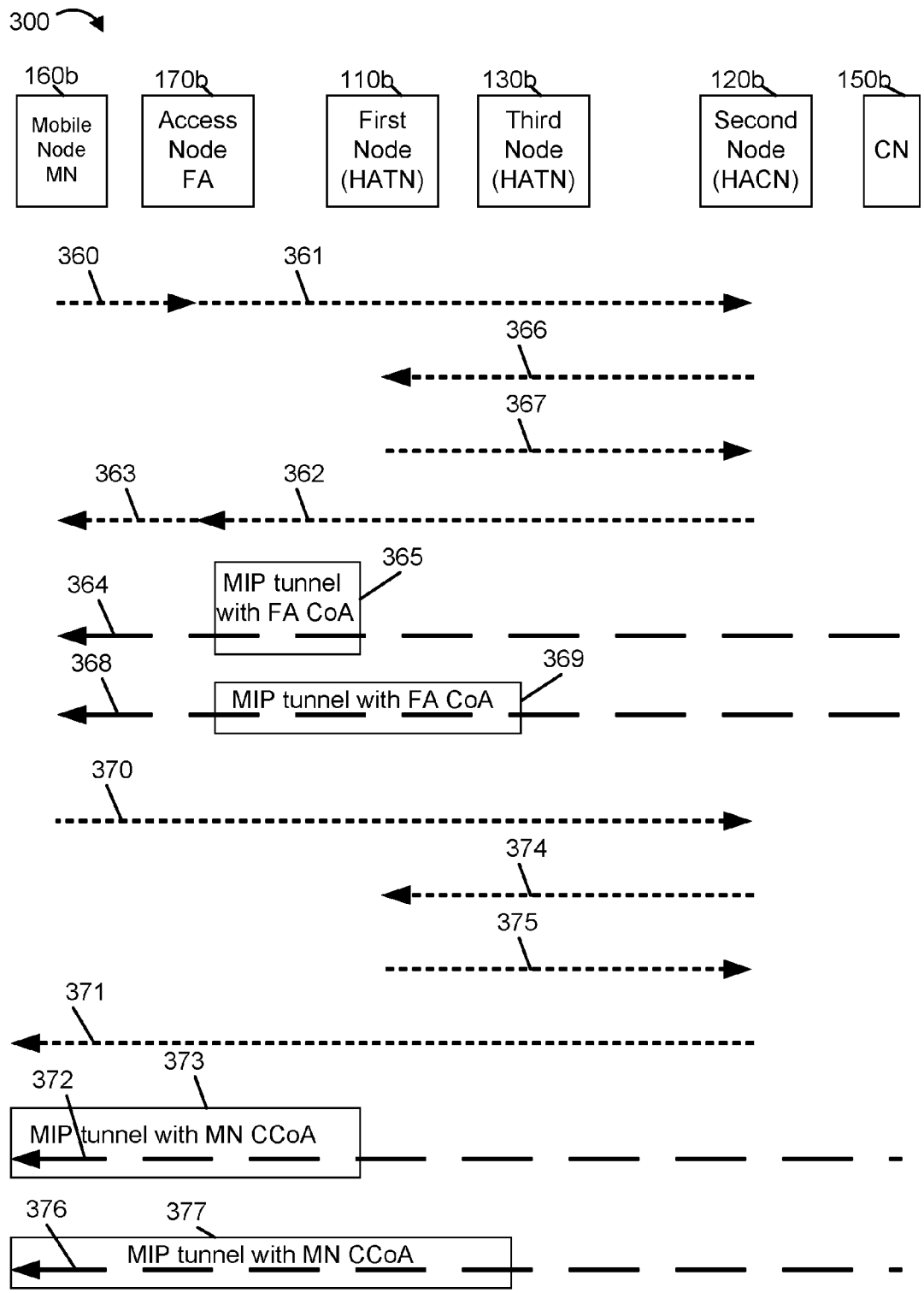
FIG. 3 illustrates equivalent prior art MIP based signaling flows for a home agent control node/home agent tunneling node (HACN/HATN) combination as opposed to a traditional HA based system.

FIG. 3 illustrates in drawing 300 the equivalent prior art MIP based signaling flows for the HACN/HATN combination as opposed to a traditional HA based system. Signaling and forwarding are described for the case of a MIP RREQ that is first directed towards the FA 170b and then the second node 120b for registering a FA CoA into the first node 110b, and also for a RREQ directed towards the second node 120b to install a MN CCoA in the first node 110b, but it should be understood that the signaling via the FA 170b can alternatively register a MN CCoA and hence enable a tunnel in the second node 120b between the third node 130b and the MN 160b. It should be further understood that the signaling can alternatively be used to install a MN CCoA or FA CoA into the third node 130b.

When directed via the FA 170b, RREQ messages 360 and 361 are employed to the second node 120b, to install a binding between the MN address 161b and the FA CoA, which is the forwarding address 171b of the Access Node 170b. The RREP is returned in messages 362 and 363 from the second node 120b to the MN 160b via the Access Node 170b. However, the second node 120b is not the HATN which instead is the first node 110b. Therefore, the second node 120b returns the address of the first node 110b to the access node 170b in message 362, so that the access node 170b knows to expect tunneled packets from the first node 110b rather than the second node 120b. In addition, the second node 120b sends a message 366 to the first node 110b, either before or after sending the RREP 362. Message 366 installs in the first node 110b the forwarding address 171b for the MN address 161b to redirect received packets towards the MNs FA CoA that has been communicated to the second node 120b by the MN 160b via the AN 170b. Message 367 is then sent by the first node 110b to the second node 120b to confirm that the forwarding address 171b' has been installed. Packet flow 364, between the CN 150b and the MN 160b, will be sent towards the first node 110b, and then redirected to the Access Node 170b in tunnel 365. If the second node 120b alternatively sends messages similar to 366 and 367 towards the third node 130b instead of the first node 110b, then packet flow 368 between the CN 150b and the MN 160b may instead be received at the third node 130b and be redirected to the Access Node 170b by tunnel 369, which the access node 170b will expect because it will have received the address of the third node 130b in message 362. Finally, it should be noted that the second node 120b can employ messages such as 366 and 367 with both the first node 110b and the third node 130b, so that either the first or third nodes 110b,130b can receive packets with a destination address equal to the MN address 161b, and redirect the packet in a tunnel to the Access Node 170b. This means that message 362 should include the addresses of both the first and third nodes 110b,130b. If the MN 110b, is instead registering a MN CCoA as the forwarding address 162b into the second node 120b then the first and third nodes 110b, 130b will alternatively be instructed to install forwarding state to redirect packets to that MN CCoA, and the addresses of the first and third nodes 110b, 130b will be returned to the MN 160b via messages 362 and 363 so that the MN 160b knows where it should tunnel upstream packets.

Message 370 and 371 show the case of the MIP RREQ being directed at the second node 120b and the RREP being directed back to the MN 160b, to register a MN CCoA into the mobility binding at the second node 120b. Once again the second node 120b then issues message 374 to the first node 110b to install a tunnel between the first node 110b and the MN CCoA 162b of the MN 160b. The message 375 is then sent by the first node 110b to the second node 120b to confirm installation of the direct tunnel. Again, message 371 can be sent by the second node 120b any time after the reception of message 370, including after sending message 374. The preferred method would be to send message 371 on reception and processing of message 375 so that the MN 160b is assured that the state in the first node 110b has been installed. The packet flow 372 from the CN 150b to the MN 160b is then received at the first node 110b and redirected to the MN 160b by tunnel 373. If the third node 130b is instead used, then the packet flow 376 from the CN 150b to the forwarding address 162b of the MN 160b may be instead received at the third node 130b and packets redirected to the MN 160b using tunnel 377. Once again, both first node and third node tunnels 373 and 377 can be installed so that packets will be forwarded to the MN 160b by whichever of the first node 110b and third node 130b is the preferred packet receiver for the MN address 161b (the MN HoA).

Figure 5:
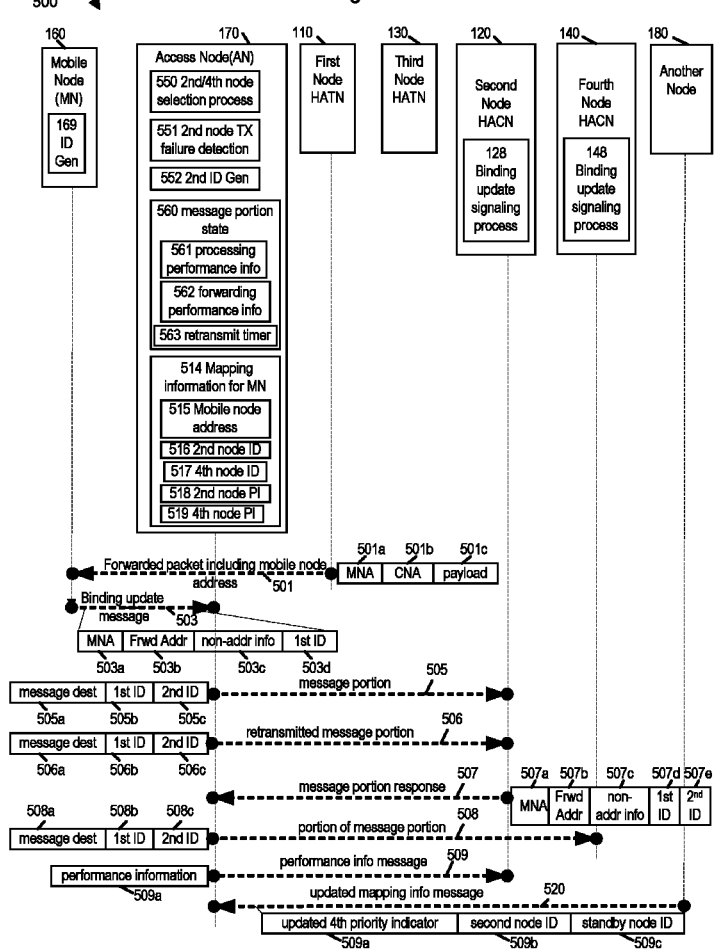
FIG. 5 illustrates exemplary nodes, state, signaling and methods of various exemplary novel embodiments from the perspective of an access node.

Various novel features and aspects of various embodiments will now be described in relation to drawing 500 of FIG. 5 from the perspective of the Access Node 170. FIG. 5 shows a forwarded packet 501 including mobile node address 501a, a CNA 501b, and a payload 501c, the forwarded packet 501 being forwarded from the first node 110 to the MN 160 via the Access Node 170. The access node 170 stores information 514 indicating a mapping between the MN address 515 and both second node identifier 516 and fourth node identifier 517. The MN 160 transmits a binding update message 503 to the Access Node 170 which includes the MN address 503a, the forwarding address 503b, and optionally includes non-address information 503c and first identifier 503d. The Access Node 170 then transmits a portion of said received binding update message 503 as message portion 505 to one of the first and second nodes 110,120 as indicated by the message destination field 505a, the message portion further including a first identifier 505b and a second identifier 505c. The access node 170 selects between the second and fourth nodes 120,140 as the destination of said message portion 505, one option being that the selection is based on at least some information that is included in the binding update message, such as said non-address information 503c. The access node 170 can select the second node 120, rather than the fourth node 140, as the destination of message portion 505, based on a priority indicator included in said stored mapping information, said priority indicator being associated with at least one of the second and fourth nodes such as $2^{nd}$ node priority indicator 518 and $4^{th}$ node priority indicator 519. The various elements of the mapping information 514 can be updated by the reception of updated mapping information message 520 received from, for example, the second, fourth and another node 120,140,180. This can include updates to the priority indication information 518,519 corresponding to one of the second and fourth nodes 120,140.

The access node 170 stores message portion processing performance information 561 and message portion forwarding performance information 562 regarding at least one previous message portion forwarded by said access node 170 to one of said second and fourth nodes (120, 140), such that the selecting of the second node 120 rather than the fourth node 140 as the destination for said message portion is performed as a function of said stored performance information.

The access node 170 can execute a retransmit timer 563 associated with said forwarded message portion and then the access node 170 can retransmit said 506 message portion to the second node 120 when the retransmit timer 563 expires prior to reception of a response message portion 507 to the forwarding of said message portion 505, 506. Message portion 507 can include the Mobile Node address 507*a*, forwarding address 507*b*, non-addr information 507*c* such as security parameters, and $1^{st}$ and second identifiers 507*d* and 507*e*.

The access node 170 can execute a second node transmission failure detection process 551 and transmit at least a portion of said message portion 508 to the fourth node 140 when the second node transmission failure detection process 551 indicates a transmission failure associated with the transmission of the message portion 505 to the second node 120.

The received binding update message 503 can include a first identifier 503*d*, which is included in said transmitted message portion 505 as first identifier 505*b*. The access node 170 can add a second identifier 505*c* into said transmitted message portion 505, the value of said second identifier 505*c* being different for said transmitted message portion 505 and a retransmitted message portion 506

The received binding update message 503 can include a first identifier 503*d* and the access node 170 can add a second identifier 508*c* to the portion of said message portion 508 transmitted to said fourth node 140, the value of said second identifier 508*c* being different from the value of the second identifier 505*c* included in the transmission of said message portion 505 to said second node 120. (i.e. the HATN discriminates between the two messages by the $2^{nd}$ ID value)

The received binding update message 503 can include a first identifier 503*d* and the access node 170 can add a second identifier 508*c* to the portion of said message portion 508 transmitted to said fourth node 140, the value of said second identifier 508*c* being the same as the value of the second identifier 505*c* included in the transmission of said message portion 505 to said second node 120 (i.e. the HATN can discriminate between the two messages because they come via different HACNs)

The access node can transmit a message 509 to one of the second and fourth and another nodes 120,140,180, including performance information 509*a* corresponding to the stored performance information. When the access node 170 receives a message including updated mapping information 520, said updated mapping information 520 including at least one of a second node identifier 520*b* and a standby node identifier 520*c*, said standby node identifier 520*c* corresponding to a standby node such as network node 192 to be used in place of said fourth node 140 with respect to processing of binding update messages 503 including said mobile node address 161.

Figure 6:
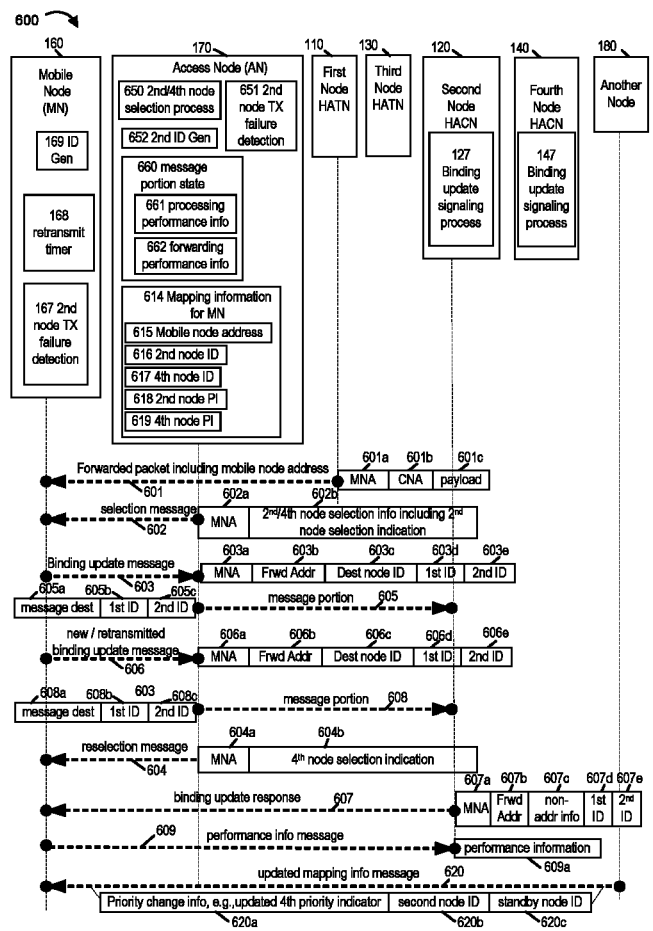
FIG. 6 illustrates an alternative set of signaling and methods that can be used at an Access Node to support multiple HACNs.

FIG. 6 illustrates in drawing 600 an alternative set of signaling and methods that can be used at the Access Node 170 to support multiple HACNs. A forwarded packet 601 including mobile node address 601*a* is shown being forwarded by first node 110 to the MN 160 via the Access Node 170. To support such forwarding, the access node 170 is operated to store information 614 indicating a mapping between the MN address 161 corresponding to the mobile node 160 and the second and fourth nodes 120,140. This information is stored as mobile node address 615, second node identifier 616, and fourth node identifier 617. The Access Node 170 is then operated to transmit a selection message 602 to the MN including second/fourth node selection information 602*b* that indicates that the MN should transmit binding update messages including the MN address towards the second node 120. The Access Node 170 is then operated to receive a binding update message 603 from the mobile node 160, said binding update message 603 including the MN address 603*a*, a forwarding address 603*b*, and a destination node identifier 603*c*, said destination node identifier 603*c* identifying said second node 120 as the destination of the binding information, said forwarding address 603*b*, such as addresses 171, 171',162, 162' being used by said first node 110 to forward packets including said MN address 161 which is included in message part 603*a*. The Access Node 170 is then operated to forward a portion 605 of said binding update message 603 to the second node 120 as indicated by message destination portion 605*a* which is the destination node identifier 603*c*.

The second and fourth nodes (120,140) are nodes which process binding update signaling, using binding update signaling processes (127,147), respectively, for a binding between a mobile node address 161 and a forwarding address 171,171 ',162,162' used by said first node 110 to forward packets 601 including said mobile node address.

The step of operating the access node 170 to transmit selection message 602 to the MN 160 that indicates that the MN should transmit binding update messages 603 including the MN address 603*a* towards the second node 120 is performed after operating the access node 170 to select between said second and fourth nodes 120,140 as the destination of at least one binding update message 603 to be transmitted from the MN 160.

The access node 170 selects between the second and fourth nodes (120,140), using $2^{nd}/4^{th}$ node selection process 650, based on a priority indicator such as second node and fourth node priority indicators 618,619 that is included in said stored mapping information 614, that is associated with at least one of the second and fourth nodes (120,140), said priority indicator (618,619) indicating that said second node 120 has priority over said fourth node 140.

The Access Node 170 is then operated to receive an updated mapping information message 620, including updated mapping information that includes priority information 620*a* that indicates changes in priority indication information to be made to stored priority information (618,619) corresponding to at least one of the second and fourth nodes (120,140) such as updated fourth node priority information 620*a*. This updated mapping information message 620 is transmitted towards the Access Node 170 by one of the second, fourth and another node 120,140,180. The another node could be a AAA node or a Home Agent Database Node (HADN).

The Access Node 170 stores at least one of message portion processing performance information 661 and message portion forwarding performance information 662 in message portion state 660, regarding at least one previous message portion such as message portion 605 forwarded by said access node to one of the second and fourth nodes (120,140). The Access Node 170 can then select between the second node 120 and the fourth node 140 as a function of said stored performance information. This is useful because the forwarding or processing information state (661,662) can indicate excessive load or failures at one of said second and fourth nodes (120,140), and therefore direct subsequent message portions 605 towards the other of the second and fourth nodes (120,140)

The MN 160 executes a retransmit timer 168 associated with said binding update message 603 and the MN is then operated to retransmit said binding update message 606 towards the second node 120 when the retransmit timer 168 expires prior to reception of a binding update response message 607 to said transmitted binding update message 603. This enables the MN to undertake repeat attempts of the binding update via the second node 120. Message portion 607 can include, in addition to the Mobile Node address 607a, the forwarding address 607b, non-addr information 607c such as security parameters, and $1^{st}$ and second identifiers 607d and 607e.

One of the Access Node 170 and the MN 160 is operated to execute a second node transmission failure detection process (651, 167), respectively. When the failure detection process 651 indicates a transmission failure associated with said binding update message portion 605 that was transmitted to the second node then the access node 170 is operated to transmit a reselection message 604 to the MN 160 that includes a second/fourth node selection indicator 604b indicating that the fourth node is selected. The reception of this reselection message 604 or the indication of a transmission failure by the second node transmission failure detection process 167 in the MN 160, causes the MN 160 to perform one of: retransmit said binding update message 606 including the MN address 606a towards the fourth node 140 and, transmit a new binding update message 606 to the fourth node 140. The Access Node 170 is then operated to rereceive one of said new and retransmitted binding update messages 606 from the mobile node 160 including the MN address 161 in message part 606a, a forwarding address 606b, and an identifier of the fourth node 140 as the destination node identifier 606c, said forwarding address having the value of one of forwarding addresses 171,171 ',162, 162' that are used by said first node 110 to forward packets including said MN address 601.

The received and rereceived retransmitted binding update messages (603,606) include a first identifier (603d,606d), respectively. The Access Node 170 is operated to generate a message portion (605,608) from each of said received and rereceived retransmitted binding update messages (603,606), respectively, each of said message portions (605,608) further including a second identifier (605c,608c), respectively, the value of said second message identifiers (605c,608c) being different in each of said message portions (605,608), respectively, transmitted to the second node 120. The second identifier is then used by subsequent nodes such as the first and second nodes (110,120) to distinguish between the message portion 605 and the retransmitted message portion 608. The second identifiers (605c,608c) that are included in message portions (605,608) are optionally included in the received and rereceived retransmitted binding update messages (603,606) in message parts (603e and 606e), respectively.

The received and rereceived retransmitted binding update messages (603,606) can include a first identifier (603d,606d), the value of the first identifiers in said messages (603,606), respectively, having the same value. One of the mobile node 160 and the access node 170 is then operated to generate a second identifier (605c,608c) that is included in the message portion (605,608) transmitted to each of said second and fourth nodes (120,140), the value of said second identifiers being different. This enables the value of the second identifier to be used to distinguish between the two message portions at upstream nodes such as the first node 110.

When the received and rereceived new binding update messages (603,606) include a first message identifier (603d, 606d), and the value of the first identifiers in each of said messages (603d,606d) are different such that an upstream such as the first node 110 can distinguish between the messages using the first identifier values (603d,606d) only.

The access node 170 may be, and sometimes is, operated to transmit a performance information message 609 to one of the second, fourth and another nodes (120,140,180) including performance information 609a corresponding to the stored performance information 661,662. The access node 170 may further be operated to receive a message 620 including updated mapping information, said updated mapping information including at least one of a second node identifier 620b and a standby node identifier 620c, said standby node identifier 620c corresponding to a standby node such as network node 192 to be used in place of said fourth node 140 with respect to processing of binding update messages 603 including said mobile node address 603a.

Figure 7:
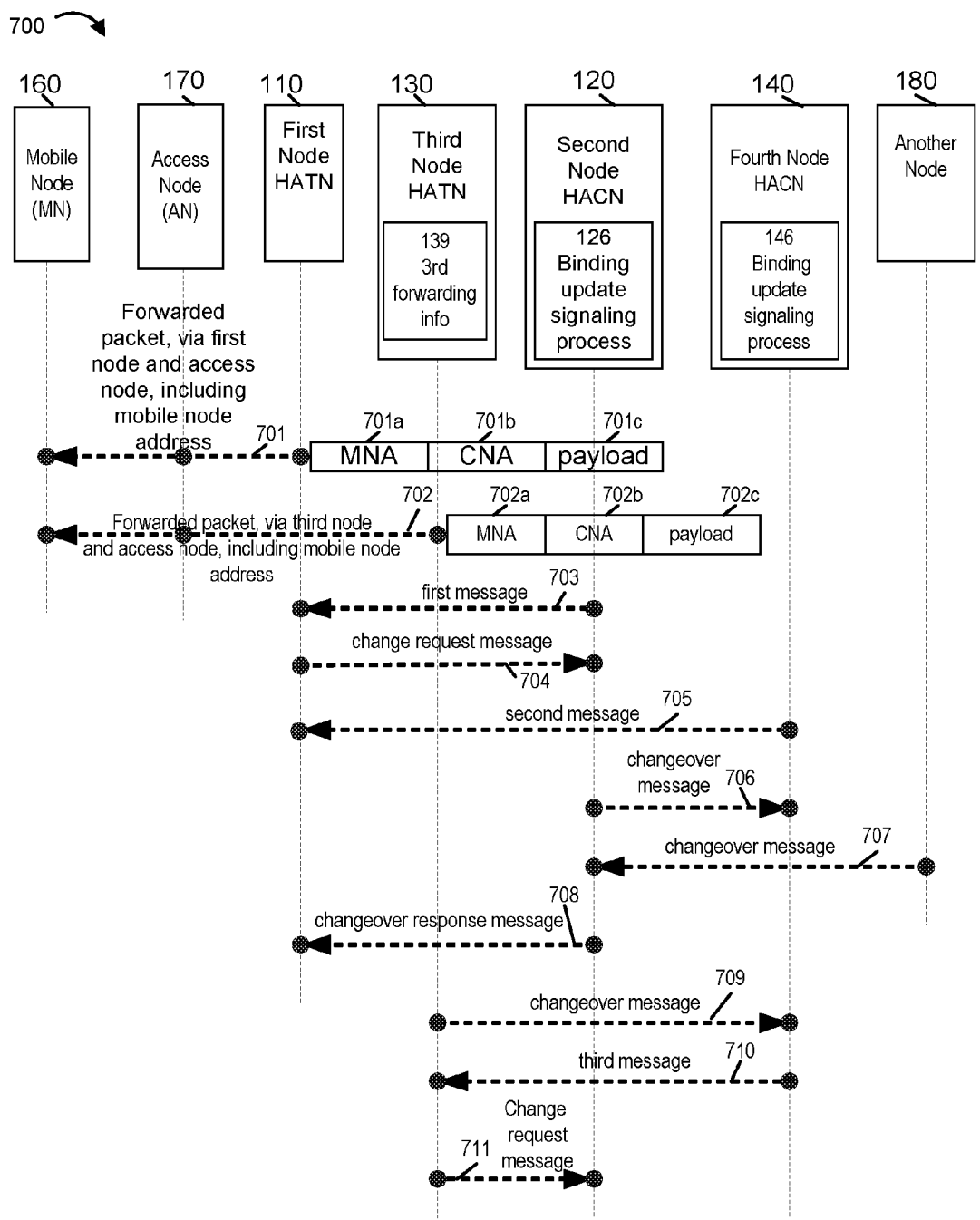
FIG. 7 illustrates exemplary nodes, state, signaling and methods of various exemplary novel embodiments from the perspective of exemplary second and fourth nodes, e.g., HACNs, wherein the second node and the fourth node control the forwarding performed by the first node and the third node, e.g., HATNs, to a MN.

FIG. 7 illustrates in drawing 700 the exemplary nodes, state, signaling and methods of various novel embodiments from the perspective of the second and fourth nodes (120,140) wherein the second node 120 and then the fourth node 140 control the forwarding performed by the first node 110 and the third node 130 to the MN 160. FIG. 7 indicates forwarded packets 701 via the first node 110 and access node 170 including the MN address 161 and forwarded packets 702 via the third node 130 and access node 170 including the MN address 161. It further indicates that the second and fourth nodes (120,140) include binding update signaling processes (126, 146), respectively, which work together with binding update signaling processes (127,128,147,148) as shown in FIGS. 5 and 6, to perform the signaling of the embodiment at the second and fourth nodes (120,140), respectively.

To manage such forwarding in a preferred scheme, the second node 120 sends a first message 703 to the first node 110 that includes first forwarding information, said first forwarding information to be used for forwarding packets including a mobile node address via the first node 110 and the access node 170. Message 703 includes the similar fields as message 402. The second node 120 then receives a change request message from the one of the first and third nodes (110,130) requesting that the second node 120 stop providing forwarding information using a subsequent message 703 to the first node 110 for packets including said mobile node address 161. Exemplary change request message 704 from first node 110 to second node 120 is such a change request message. Message 704 includes the similar fields to those in message 405. The fourth node 140 will then transmit the second message 705 that includes second forwarding information, said second forwarding information to be used for forwarding packets including said mobile node address via one of the first and third nodes (110,130) and the access node 170. Message 705 includes the similar fields as message 450. To enable the fourth node 140 to know that it needs to send the second message 705 to one of the first and third nodes (110, 130), the second node 120 can transmit a changeover message 706 to one of the fourth node 140 and another node 180. Message 706 includes similar fields to those in message 415, as well as an identifier such as an address of at least one of the first and third nodes. In this example, the changeover message 706 is sent from the second node 120 to the fourth node 140. The changeover message would indicate the change from the second node 120 to the fourth node 140, and in the case of it being directed at the Another Node 180, which could be the HA Database Node or a AAA node, then the Another Node 180 would propagate the changeover message to the fourth node 140. In advance of operating the fourth node 140 to transmit the second message 705 to the first node, the second node 120 could alternatively receive a changeover message 707 from one of the fourth node 140 and another node 180, said changeover message 707 indicating that the second node 120 is to stop providing forwarding information for the MN address 161 via message like message 703, said changeover message 707 having been triggered by local state in the fourth or Another Node 140,180 or be triggered by reception of a message at the fourth or Another node 140,180 such as a change request message like 704 from one of the first and third nodes 110,130. Message 707 includes similar fields to that in message 415, as well as an identifier such as an address of the fourth node, and an identifier such as an address of at least one of the first and third nodes. In this example, changeover message 707 received by second node 120 is from the another node 180.

A second alternative scheme employs the first and second messages (703,704) but instead of one of the first and third nodes (110,130) sending a change request message 704 to request a change from the second node 120 to the fourth node 140, the second node 120 instead receives a changeover message 707 from one of the fourth node 140 and another node 180. The second node then optionally returns a changeover response message 708 to one of the first, third, fourth and another nodes (110,130,140,180), preferentially to the sender of the changeover message 707. Message 708 includes similar fields to that included in message 415. Alternatively, in advance of the step of operating the second node 120 to receive a changeover message 707 from one of the fourth node 140 and another node 180, the fourth node 140 can be operated to receive a changeover message 709 from one of the first node 110, third node 130, second node 120 and another node 180. Message 709 includes similar fields to that included in message 405.

A third alternative scheme employs the first message 703 from the second node 120 to the first node 110, the second node 120 then receiving the changeover message 707, followed by the fourth node transmitting a third message 710 to the third node 130 that includes third forwarding information, said third forwarding information 139 to be used for forwarding packets including said mobile node address 161 via the third node 130 and an access node 170. Message 710 includes similar fields to that included in message 450, but of course includes $3^{rd}$ forwarding information. This means that the changeover of control from the second node 120 to the fourth node 140 includes a changeover of packet forwarding from the first node 110 to the third node 130. In advance of the step of operating the second node 120 to receive a changeover message 707 from one of the fourth node 140 and another node 180, the fourth node 140 receives a changeover message 709 from one of the first node 110 and the third node 130.

In a fourth alternative scheme, the second node 120 sends the first message 703 to the first node 110 that includes first forwarding information, said first forwarding information to be used for forwarding packets including a mobile node address 161 via the first node 110, in addition to an access node 170. The second node 120 then receives a change request message 711 from one of the first node and third nodes 110,130 requesting that the second node 120 stop providing forwarding information to the first node 110 for packets including said mobile node address 161. Message 711 includes message fields similar to message 405. The fourth node 140 then transmits the third message 710 to the third node 130 that includes third forwarding information, said third forwarding information 139 to be used for forwarding packets including said mobile node address 161 via the third node 130 and an access node. In advance of the step of operating the fourth node 140 to transmit the third message 710 to the third node 130, the second node 120 can optionally receive a changeover message 707 from one of the fourth node 140 and another node 180.

In each of the various exemplary schemes, the first and second (703, 705) or first and third forwarding messages (703,710) can include the same or different (i.e. a new Access Node) forwarding addresses for packets including the MN address 161.

Figure 4:
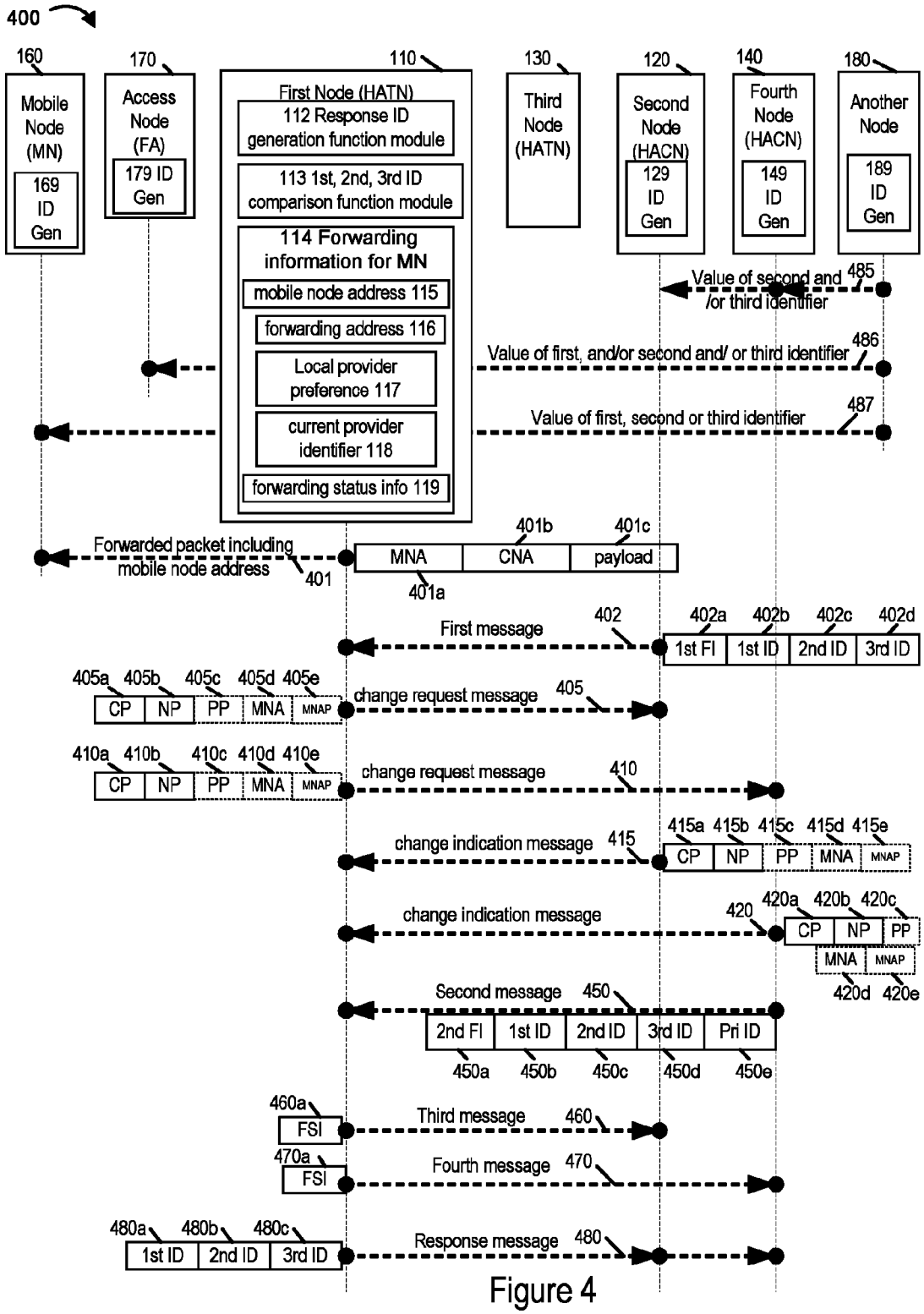
FIG. 4 illustrates exemplary nodes, state, signaling and methods of various exemplary novel embodiments from the perspective of a first node, e.g., a home agent tunneling node.

FIG. 4 illustrates in drawing 400 exemplary nodes, state, signaling and methods of various embodiments from the perspective of the first node 110. The first node 110 receives a first message 402 from the second node 120 which includes first forwarding information 402a associated with the MN 160 that is stored in the first node 110 in forwarding information 114. Forwarding information 114 includes mobile node address 115 which would have the value of MN address 161 and forwarding address 116 which would have the value of forwarding address 162 and/or 171 from the MN 160 and AN 170 respectively. The forwarding information 114 enables packets that arrive at the first node 110 that are destined to the MN address 161 to be forwarded towards the forwarding address 116 as a forwarded packet 401, said packet 401 including mobile node address 401a, a CN address 401b, and a payload 401c.

Some time later, the first node receives a second message 450 that is associated with the MN address 161, and which includes second forwarding information 450a. This is used to update forwarding information 114 in the first node 110. The second forwarding information 450a can include the same forwarding address as the first forwarding information 402a or it can include a new forwarding address such as 171' or 162' as a result of a move by the MN to the Access node 170'. The forwarding address received in second message 450 is stored in the first node as forwarding address 116 so that forwarded packets including mobile node address 401a continue to be forwarded towards the MN 160. The first node keeps track of which of the second and fourth nodes 120, 140 is providing forwarding information 402a, 450a by storing an identifier of the current provider of forwarding information as current provider identifier 118. The identifier could be an address, name, location or some combination of these information types that is associated with the current provider, some portion of which is included in messages 405,410,415 and 420. The first node 110 can also store a local provider preference to indicate which of the second and the fourth nodes 120,140 it would prefer to provide forwarding information.

Before receiving the second message 450, the first node 110 can transmit a change request message 405 to the second node 120, requesting that the second node 120 no longer provide forwarding information such as forwarding information 402a to the first node 110. Change request message 405 can optionally indicate that the first node 110 would like to receive forwarding information henceforth from the fourth node 140. Change request message 410 can additionally or alternatively be sent to the fourth node 140 to request that the fourth node 140 start to provide forwarding information such as forwarding information 450a to the first node 110. The change request message 410 can optionally indicate that the second node 120 is no longer to provide forwarding information to the first node 110 such as forwarding information 402a. Change indication message 415 is sent from the second node 120 to the first node 110. It can be sent in response to change request message 405 to indicate the result of the change request at the second node 120. It can alternatively be received by the first node 110 without first sending change request message 405 to indicate that the second node 120 is no longer going to provide forwarding information 402a to the first node 110, and can optionally include an indication that the fourth node 140 will instead be providing forwarding information such as 450a to the first node 110.

Change indication message 420 is sent from the fourth node 140 to the first node 110. It can be sent in response to change request message 410 to indicate the result of the change request at the fourth node 140. It can alternatively be received by the first node 110 without first sending change request message 410 to indicate that the fourth node 140 will instead be providing forwarding information such as 450a to the first node 110, and can optionally include an indication that the second node 120 is no longer going to provide forwarding information 402a to the first node 110. The current provider (CP) information is included in field 405a,410a, 415a and 420a whilst the next provider (NP) information is included in field 405b,410b,415b,420b and the Previous Provider (PP) is included in field 405c,410c,415c,420c. Change request and indication messages 405, 410, 415,420 can be specific to the MN address 161, in which case they include MNA field (405d, 410d, 415d,420d) or can be for one or more MNA prefixes (MNAPs) of such MN addresses at the first node 110 in which case they include at least one MNAP field (405e, 410e, 415e,420e). The current, previous or next provider information, can instead be implied by the change type information (CTI) and the address of the provider node that has transmitted or is to receive the message, which is either the second or the fourth node 120,140. The change type information enables the receiving node to know that the sender is requesting to be, or is now, the current, previous or next provider, and the change type field enables the sending node to request that the receiving node become the current, next or previous provider.

Whilst the first node 110 is being provided with forwarding information by the second node 120, then the first node 110 periodically, and/or in response to reception of messages such as the first message, can transmit the third message 460 to the second node 120 that includes forwarding status information 460a for at least one MN address such as MN address 161.

Whilst the first node 110 is being provided with forwarding information by the fourth node 140, then the first node 110 periodically, and/or in response to reception of messages such as the second message, can transmit the third message 460 to the second node 120 that includes forwarding status information 470a for at least one MN address such as MN address 161. Forwarding status information 460a, 470a is stored in the first node 110 as forwarding status information 119 and could include for example one of, the number of packets forwarded by the first node 110 for a MN address 161 since the last such third or fourth message was transmitted, and, the length of time since such a packet was forwarded by the first node 110. Forwarding status information 119 could include information for each forwarding direction (from and to the MN 160) or it could be stored as a combination of both directions of forwarding.

The first node needs to be able to distinguish between different messages that contain forwarding information, such as first and second messages 402,450 and to protect such messages from replay attacks. The MN 160 adds a first identifier into a message that updates its forwarding address 162, 171 and which is then propagated through the Access Node 170 and the second node 120 into the first message 402 that is transmitted to the first node 110. The first identifier can be generated by ID generation module 169 or it can be generated by the ID generation module 189 in the Another Node 180 and sent to the MN 160 in message 487. Similarly the first identifier can be transmitted by the MN 160 in a message that is then propagated by the fourth node 140 into the second message 450 that is transmitted to the first node 110. The value of the first identifier in the first and second messages 402b,450b can be the same. The first node can then select between the forwarding information carried in the first and second messages (402a,450a) by the order of reception or by the local provider preference state 117 that indicates a preference for the fourth node 140 over the second node 120. Alternatively, the value of the first and second identifiers in the first and second messages (402b,450b) can be different. The first node can then compare the values in fields 402b and 450b, using the first second and third identifier comparison function module 113, and use the results of the comparison to indicate if the second message 450 contains newer forwarding information 450a, and then updating the forwarding information 114 with the forwarding information 450a in the second message 450 if the indication is true. The first identifier generation modules 189 and 169 and the first second and third identifier comparison function module 113 could employ a first identifier that is a sequence number or a timer and the result of the comparison function 113 would be that the value of the first identifier 450a in the second message 450 is less than, greater than or equal to the value of the first identifier 402a in the first message 402. When the first and second messages 402,450 contain different values of the first identifier, the second message 450 can be a restoration message that is transmitted via the fourth node 140 to the first node 110 when one of the second node 120 and the communications path between the second node 120 and the first node 110 has failed. This can be detected by the failure of the MN 110 to receive a response message, said response message being dependent on the reception of a response message 480 at the second node 120 that is transmitted by the first node 110. This response message 480 can additionally be transmitted to the fourth node 140 in response to the second message 450. The response message 480 can include the first identifier 480a, the value of the first identifier 480a in the response message 480 being the same as the value (402b,450b) received in the one of the first and second messages (402,450), respectively, to which the response message 480 is a response. Alternatively, the value of the first identifier 480a in the response message 480 can be different to the value of the first identifier (402b,450b) in one of the first and second messages (402,450) to which the response message 480 is a response, and is instead generated as a function of said first identifier (402b,450b) using response identifier generation function module 112, which can optionally be a security function that also uses a security key that is shared with the generator module (169,189) that generated the value of the first identifier. This security processing ensures that the value of the first identifier 480a in the response message 480 is not easy to be produced by a node other than the first node 110.

When the values of the first identifier (402b,450b) in the first and second messages (402,450) are the same, then the order of generation of the forwarding information (402a, 450a) in the first and second messages is unknown. In this case, the first message 402 can optionally include a second identifier 402c. The second identifier is transmitted to the second node 120 by one of the MN 160 and the Access Node 170. The second identifier can also be included in the second message 450 from the fourth node 140. The first node 110 can then order forwarding information (402a,450a) that is received in the first and the second messages (402,450), respectively, so that at least a first repeat transmission of said forwarding information will be distinguished from a previous reception of said same forwarding information at the first node in the event that multiple copies of said forwarding information are transmitted, and then operating the first node to ignore the second message.

Alternatively, when the values of the first identifier (402b, 450b) in the first and second messages (402,450), respectively, are the same, then the first and second messages (402, 450) can include the second identifiers (402c,450c) and third identifiers (402d,450d). The value of the third identifier is then an identifier generated by one of the second, fourth and another nodes (120,140,180) by identifier generator function modules (129,149,189), respectively. When the third identifier is generated in the another node 180, then it is transmitted to one of the second and fourth nodes by another node 180 using message 485. The first node 110 is then operated to compare the value of the second and third identifiers that are received in the first and second messages 402,450 to determine if the second message 450 contains new forwarding information corresponding to the mobile node address, new forwarding information being identified by said values of the third identifier 402d,450d being the same and the value of the second identifier in the second message 450c having been generated after the value of the second identifier 402c in the first message. The first node can then update the forwarding information 114 with the forwarding information 450a received in the second message.

Instead of the second identifier 402c being received from the MN 160 or Access Node 170, it can alternatively be generated by the second node 120 in identifier generation function module 129, and, transmitted to the second node 120 by Another Node 180 in message 486. In this case it is used to identify between repeat transmissions by the second node 120 to the first node 110, of the same version of forwarding state (i.e. the same value of the first identifier 402b that was received from the MN 160 and/or Access Node 170.

When the values of the first identifier (402b,450b) in the first and second messages (402,450) are the same, and the first and second messages further include the third identifier (402d,450d), then the first node 110 can be operated to compare the value of the third identifiers (402d,450d) received in the first and second messages (402,450) to determine if new forwarding information 450a corresponding to the mobile node address 161 has been received, said values of the third identifier being different when new forwarding information has been received. The newest forwarding information can be identified by the first second and third identifier comparison function module 113 determining which of the third identifiers (402d,450d) were generated last. If the values of the third identifiers are the same then one of the order of reception and the local preference state will indicate that the forwarding state 450a in the second message will be stored in the forwarding state 114. Note that when the value of the third identifiers (402d,450d) are the same, but the first second and third identifier comparison function indicates that the value of the first identifiers (402b,450b) are different then the second message 450 includes new forwarding information 450a if the value of the first identifier 450b in the second message 450 was generated after the value 402b in the first message 402.

The third identifiers (402d,450d) can be transmitted by one of the MN 160 and the Access Node 170 towards the second and fourth nodes (120,140). The third identifiers (402d,450d) can include a portion that contains one of a priority indication, a sequence number and a timer value, said priority indication affecting the local provider preference state 117. When the values of third identifiers (402d,450d) are the same, as well as using the reception order of the first and second messages (402,450) or the local provider preference 117, the first and second messages can further include a second identifier (402c,450c) that is used to order repeat transmissions of forwarding information. The first node 110 is then operated to compare the values of the second identifiers (402c,450c) in the first and second messages (402, 450), to order received forwarding information. The second message 450 can further include a primary indicator 450e such that the first node 110 can be operated to update forwarding information for the mobile node address 161 using the forwarding information 450a if the primary indicator is set to primary, indicating that the fourth node 140 is now the current provider of forwarding information. The response message 480 to the first message 402 can include the value of the third identifier 480c that was received in the first message 402d. The response message 480 to the second message 450 can include the value of the third identifier 480c that was received in the second message 450d. The first node can transmit a response message 480 to one of the second and fourth nodes (120,140) and include the third identifier 480c, the value of the third identifier this time being different to the value of the third identifier that was received in the message (402,450) which is being responded to.

Figure 8:
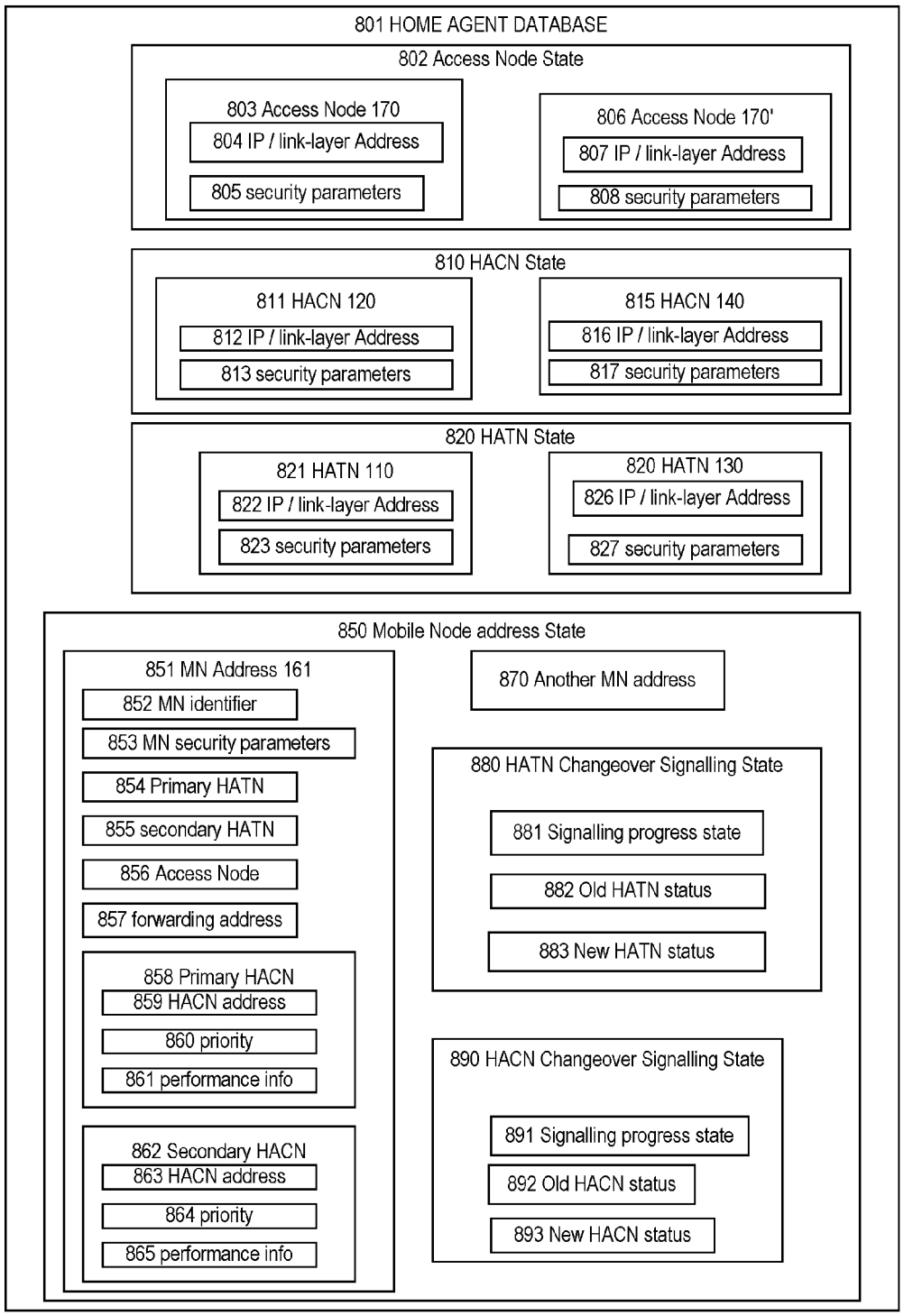
FIG. 8 shows an exemplary Home Agent Database which can be located in a second node, e.g., HACN node, fourth node, e.g., another HACN node, or in the Another node, e.g., Home Agent Database Node or AAA node, or distributed between these nodes.

FIG. 8 shows an exemplary Home Agent Database (HAD) 801 which can be located in the second node 120, fourth node 140 or in the Another node 180 (HADN), or distributed between these nodes. The database 801 ensures that there is a single repository of system configuration information and of MN binding information so that either the second node 120 or the fourth node 140 can interact with the first node 110, third node 130, MN 160 and Access Node 170 to perform mobility management according to novel features of an exemplary embodiment. In a preferred implementation, the HADN is at the Another Node 180 or a number of such Another Nodes, with local copies of parts of that database kept in the second node 120 and fourth nodes 140. The HAD 801 includes Access Node state 802, HACN state 810, HATN state 820, and Mobile Node address state 850. Access Node state 802 includes configuration information (803,806) of the Access nodes in the network 100 such as Access Node (170,170'). Access node state (803, 806), corresponding to access nodes (170, 170') includes their IP and/or link-layer addresses (804, 807) and the security parameters (805, 808), respectively, used to secure communications. HACN state 810 includes information 811 on the HACN 120 and information 815 on HACN 140. HACN state information (811, 815) corresponding to nodes (120, 140) includes IP and/or link-layers addresses (812,816) and security parameters (813,817), respectively. HATN state 820 includes information 821 on HATN 820 and information 825 on HATN 130. HATN state information (821, 825) corresponding to nodes (110, 130) includes IP and/or link-layer addresses (822,826) and security parameters (823,827), respectively. Mobile Node address state 850 includes information 851 on MN address 161, and information 870 on at least one other MN address. Mobile node address state information 850 also includes HATN changeover signaling state 880 and HACN changeover signaling state 890. Information 851 includes the MN identifier 852 that is using said MN address 161 and the MN security parameters 853. It further includes an indication of the primary HATN 854, an indicator of the secondary HATN 855, an indicator of the current access node 856 and the forwarding address at that access node 857. State information 851 also includes primary HACN state information 858 and secondary HACN state information 862. HATN and HACN state (854, 855,858 and 862) within Information 851 that is associated with Mn address 161 can instead be stored for one or more address prefixes, rather than for each individual address as shown in FIG. 8. The primary HACN state and the secondary HACN state (858,862) includes the HACN address (859, 863), the HACN priority (860,864) and the performance information (861,865) associated with that HACN such as signaling and loading performance and current status (active/failed etc), respectively. The HATN changeover signaling state 880 may be stored for each MN address or for an aggregate of such addresses such as an address prefix. The changeover signaling state 880 tracks the status of the changeover from one HATN to another, or the addition or removal of a HATN as part of the use of two concurrent HATNs. HATN changeover signaling state 880 includes signaling progress state 881, old HATN status 882 and new HATN status 883. The changeover signaling progress state 881 tracks the progress of the changeover signaling message exchanges whilst Old HATN and New HATN status (882, 883) tracks the consequences of that signaling progress on the forwarding at each HATN. Similarly, the HACN changeover signaling state 890 may be stored for each MN address or for an aggregate of such addresses such as an address prefix. The changeover signaling state 890 tracks the status of the changeover from one HACN to another, or the addition or removal of a HACN as part of the use of two concurrent HACNs. HACN changeover signaling state 890 includes signaling progress state 891, old HACN status 892 and new HACN status 893. The changeover signaling progress state 891 tracks the progress of the changeover signaling message exchanges whilst Old HACN and New HACN status (892, 893) tracks the consequences of that signaling progress on the control of binding updates at each HACN.

Figure 9:
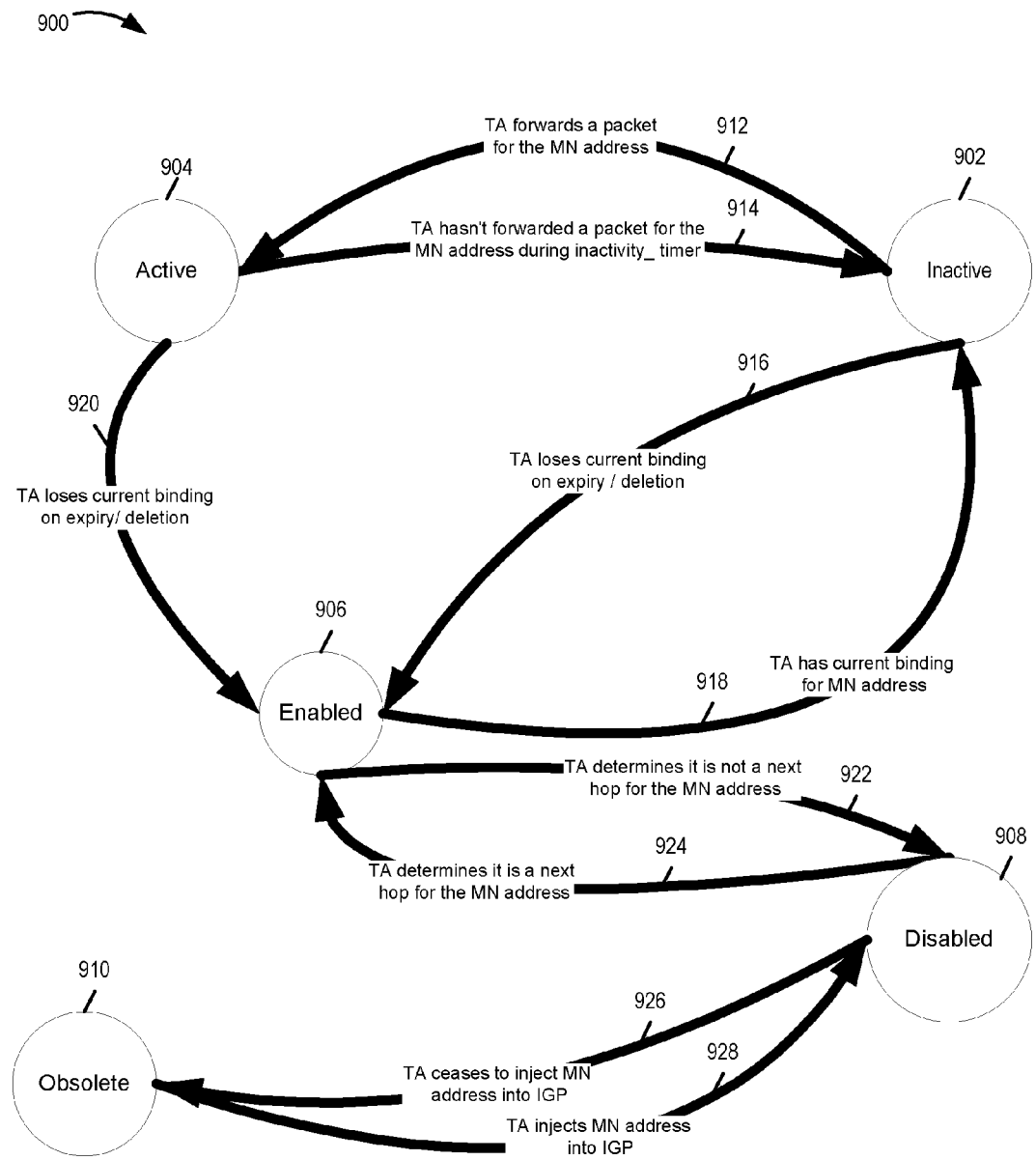
FIG. 9 is a drawing of an exemplary state diagram for an exemplary tunneling agent (TA) node in accordance with various embodiments.

FIG. 9 is a drawing of an exemplary state diagram 900 for an exemplary tunneling agent (TA) node in accordance with various embodiments. A tunneling agent node may be, and sometimes is, alternatively referred to as a home agent tunneling node. A distributed home agent node (DHA) node may be, and sometimes is, alternatively referred to as a home agent control node (HACN). The various states include an inactive state 902, an active state 904, an enabled state 906, a disabled state 908 and an obsolete state 910. The TA transitions from an inactive state 902 to an active state 904 to forward a packet for the MN address as represented by arrow 912. The TA transitions from an inactivate state 902 to an enabled state 906 in response to the TA losing current binding on expiry/deletion as indicated by arrow 916.

The TA transitions from active state 904 to inactive state 902, as represented by arrow 914, if the TA has not forwarded a packet for the MN address during an interval of time, e.g., an interval of time represented by an inactivity_timer variable value. The TA transitions from an active state 904 to an enabled state 906, as indicated by arrow 920, in response to the TA losing current binding on expiry/deletion.

The TA transitions from the enabled state 906 to the inactive state 902, as indicated by arrow 918, in response to the TA acquiring current binding for the MN address. The TA transitions from the enabled state 906 to the disabled state 908, as indicated by arrow 922, in response to the TA determining that it is not a next hop for the MN address.

The TA transitions from the disabled state 908 to the enabled state 906, as indicated by arrow 924, in response to the TA determining that it is a next hop for the MN address. The TA transitions from the disabled state 908 to the obsolete state 910, as indicated by arrow 926, in response to the TA deciding to cease to inject the MN address into the IGP. The TA transitions from the obsolete state 910 to the disabled state 908, as indicated by arrow 928, in response to the TA deciding to inject the MN address into the IGP.

Figure 10:
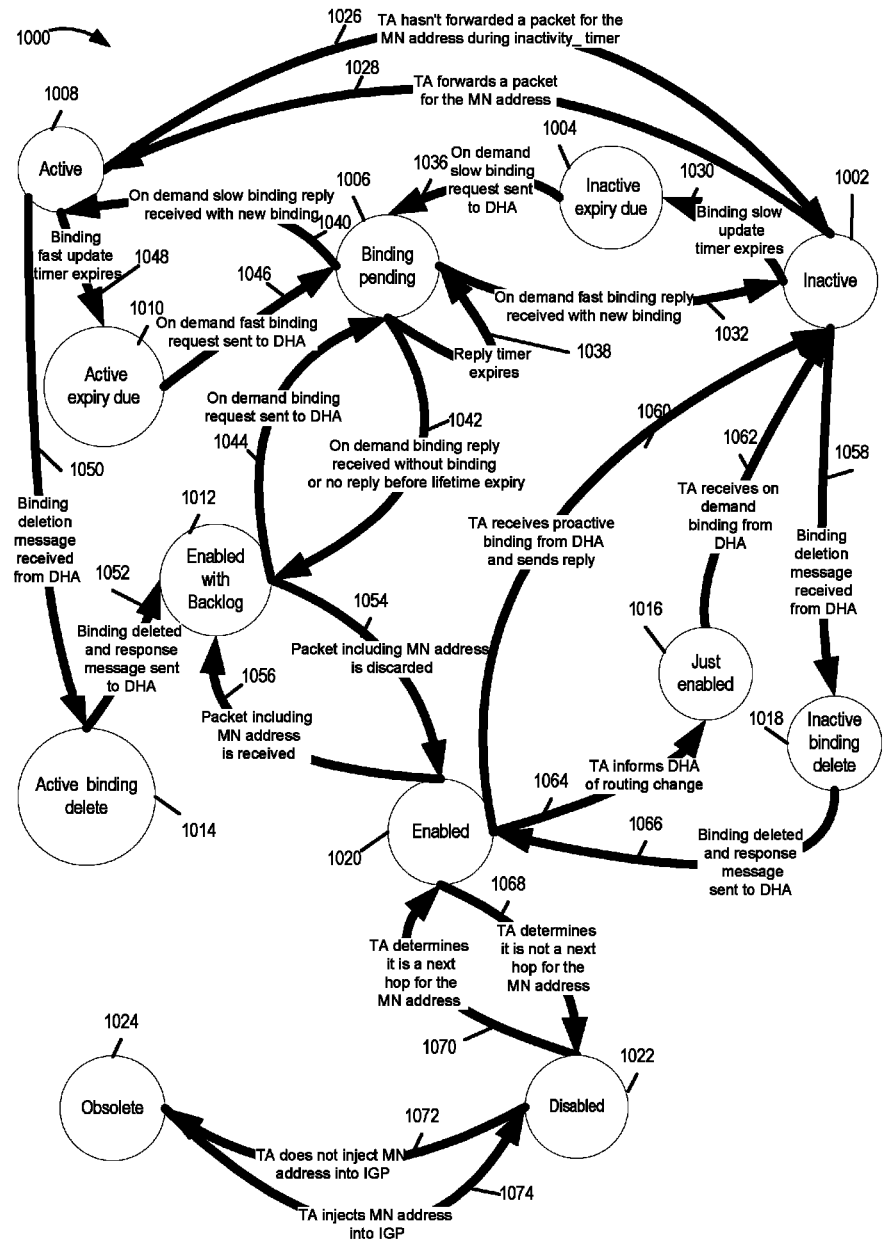
FIG. 10 is a drawing of an exemplary state diagram for an exemplary tunneling agent (TA) node in accordance with various embodiments.

FIG. 10 is a drawing of an exemplary state diagram 1000 for an exemplary tunneling agent (TA) node in accordance with various embodiments. A tunneling agent node may be, and sometimes is, alternatively referred to as a home agent tunneling node. A distributed home agent (DHA) node may be, and sometimes is, alternatively referred to as a home agent control node (HACN). The various states include an inactive state 1002, an active state 1008, an active expiry due state 1010, a binding pending state 1006, an inactive expiry due state 1004, an active binding delete state 1014, an enabled with backlog state 1012, an enabled state 1020, a just enabled state 1016, an inactive binding delete state 1018, a disabled state 1022 and an obsolete state 1024. The TA transitions from an inactive state 1002 to an active state 1008 to forward a packet for the MN address as represented by arrow 1028. The TA transitions from an inactivate state 1002 to an inactive binding delete state 1018, as indicated by arrow 1058, in response to a binding deletion message received from a DHA. The TA transitions from the inactive binding delete state 1018 to the enabled state 1020, as indicated by arrow 1066, in response to implementation of the binding deletion and sending of a response message to the DHA.

The TA transitions from the inactive state 1002 to the inactive expiry due state 1004, as indicated by arrow 1030, in response to a binding slow update timer having expired. The TA transitions from the inactivity expiry due state 1004 to the binding pending state 1006, as indicated by arrow 1036, in response to the TA deciding to send an On demand slow binding request to the DHA. Arrow 1038 indicates that the TA remains in the binding pending state while the reply timer has not expired and a reply does not occur. The TA transitions from the binding pending state 1006 to the inactive state 1002, as indicated by arrow 1032, in response to an On demand fast binding reply being received with a new binding.

The TA transitions from the active state 1008 to the inactive state 1002, as indicated by arrow 1026, in response to the TA not having forwarded a packet for the MN address during a time interval, e.g., the time interval represented by the value of the variable inactivity_timer. The TA transitions from the active state 1008 to the active binding delete state 1014, as indicated by arrow 1050, in response to the TA receiving a binding deletion message from the DHA. The TA transitions from the active state to the active expiry due state 1010, as indicated by arrow 1048, in response to the binding fast update timer having expired. The TA transitions from the active expiry due state 1010 to the binding pending state 1006, as indicated by arrow 1046, in response to a decision to send an on demand fast binding request to the DHA. The TA transitions from the binding pending state 1006 to the active state, as indicated by arrow 1040, in response to an On demand slow binding reply being received with a new binding.

The TA transitions from the active binding delete state 1014 to the enabled with backlog state 1012, as indicated by arrow 1052, in response to the binding deletion being performed and a response message being sent to the DHA. The TA transitions from the enabled with backlog state 1012 to the binding pending state 1006, as indicated by arrow 1044, in response to an On demand binding request being sent to the DHA. The TA transitions from the binding pending state 1006 to the enabled with backlog state 1012, as indicated by arrow 1042, in response to an on demand binding reply being received without a binding or no reply being received before the lifetime expiry.

The TA transitions from the enabled with backlog state 1012 to the enabled state 1020, as indicated by arrow 1054, in response to a packet including MN address being discarded. The TA transitions from the enabled state 1020 to the enabled with backlog state 1012, as indicated by arrow 1056, in response to a packet including MN address being received. The TA transitions from the enabled state 1020 to the inactive state 1002, as indicated by arrow 1060, in response to the TA receiving a proactive binding from the DHA and sending a reply.

The TA transitions from the enabled state 1020 to the disabled state 1022, as indicated by arrow 1068, in response to the TA determining that it is not a next hop for the MN address. The TA transitions from the disabled state 1022 to the enabled state 1020, as indicated by arrow 1070, in response to the TA determining that it is a next hop for the MN address. The TA transitions from the disabled state 1022 to the obsolete state 1024, as indicated by arrow 1072, in response to the TA deciding not to inject the MN address into the IGP. The TA transitions from the obsolete state 1024 to the disabled state 1022, as indicated by arrow 1074, in response to the TA deciding to inject the MN address into the IGP.

Figure 11:
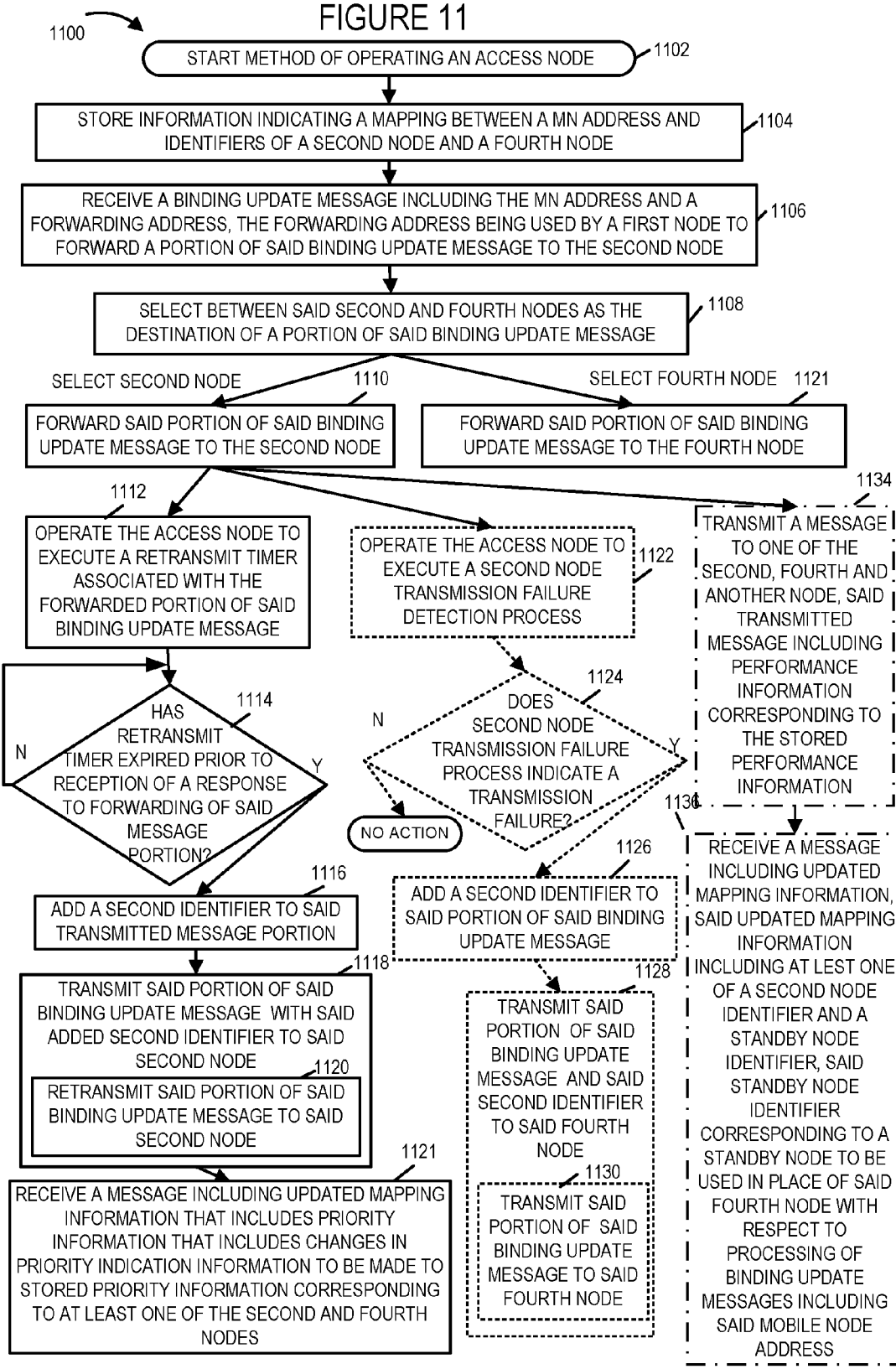
FIG. 11 is flowchart of an exemplary method of operating an access node in accordance with various embodiments.

FIG. 11 is flowchart 1100 of an exemplary method of operating an access node in accordance with various embodiments. The exemplary method is a method for use in a communications system including the access node, a first node, e.g., a first HATN, a second node, e.g., a first HACN, and a fourth node, e.g., a second HACN. In various embodiments, the communications system also includes another node, which communicates with the access node as part of the exemplary method.

Operation starts in step 1102, where the access node is powered on and initialized. Operation proceeds from start step 1102 to step 1104. In step 1104 the access node stores information indicating a mapping between an MN address and identifiers of the second node and the fourth node. Then, in step 1106, the access node receives a binding update message including the MN address and a forwarding address, the forwarding address being used by the first node to forward a portion of the binding update message to the second node. In various embodiments, the received binding update message includes a first identifier. Operation proceeds from step 1106 to step 1108.

In various embodiments, the forwarding address is an address of the access node and the access node includes a Mobile IP foreign agent. In some embodiments, the second and fourth nodes are nodes which process binding update signaling for a binding between a mobile node address and a forwarding address used by the first node to forward packets including said mobile node address.

In step 1108 the access node selects between the second and fourth nodes as the destination of a portion of the binding update message. In various embodiments, the selection of step 1108 is based on at least some information included in said binding update message. In some such embodiments, the at least some information including in the binding update message is non-address information.

In some embodiments, the access node selects between the second and fourth nodes based on a priority indicator included in the stored mapping information. For example, the access node makes the selection and selects the second node rather than the fourth node as the destination for the message based on a priority indicator included in said stored mapping information, said priority indicator being associated with at least one of the second and fourth nodes, said priority indicator indicating that the second node has priority over the fourth node.

In some embodiments, the access node stores at least one of message portion processing performance information and message portion forwarding performance information regarding at least one previous message portion forwarded by said access node to one of the second and fourth nodes, and the selecting selects as a function of the stored performance information. For example, the access node selects the second node rather than the fourth node as the destination for the message portion as a function of the stored performance information.

Depending upon the selection of step 1108, operation proceeds from step 1108 to either step 1110 if the second node was selected or step 1111 if the fourth node was selected. In step 1110 the access node forwards said portion of said binding update message to the second node. In step 1111 the access node forwards said portion of said binding update message to the fourth node.

Operation proceeds from step 1110 to one or more of steps 1112, 1122 and 1134. In step 1112 the access node operates a retransmit timer associated with the forwarded portion of the binding update message. Then, in step 1114, the access terminal checks as to whether the retransmit timer has expired prior to a reception of a response to the forwarding of said message portion. If the timer has not expired and a response has not been received, operation returns to the input of step 1114. However, if the timer expires without reception of a response, then operation proceeds from step 1114 to step 1116.

In step 1116 the access terminal adds a second identifier to said transmitted message portion. In various embodiments, the forwarded portion of the binding update message of step 1110 was also transmitted with a second identifier; however, the value of the second identifier of step 1110 is different than the value of second identifier of steps 1116 and 1118. Thus the value of the second identifier, in some embodiments, is different depending upon whether the portion of the binding message being communicated is being transmitted as an initial transmission or as a retransmission, e.g., a retransmission following a timeout expiration. Then, in step 1118 the access terminal transmits said portion of said binding update message with said added second identifier from step 1116 to said second node. Step 1118 includes sub-step 1120 which is the retransmission of said portion of said binding update message to said second node.

Operation proceeds from step 1118 to step 1121 in which the access terminal receives a message including updated mapping information that includes priority information that includes changes in priority indication information corresponding to at least one of the second and fourth nodes. In some embodiments, the received message including updated mapping information of step 1121 was transmitted by one of: the second node, the fourth node and the another node.

Returning to step 1122, in step 1122 the access node operates to execute a second node transmission failure detection process. In step 1124 the access node proceeds differently depending upon whether or not the access node transmission failure process indicates a failed transmission. If a failed transmission is not indicated, then the access node need not take any corrective action. However, if the access node transmission failure process indicates a failed transmission, then operation proceeds from step 1124 to step 1126.

In step 1126, the access node adds a second identifier to said portion of said binding update message. In various embodiments, the forwarded portion of the binding update message of step 1110 was also transmitted with a second identifier; however, the value of the second identifier of step 1110 is different than the value of second identifier of steps 1126 and 1128. For instance, the first node, e.g., tunneling agent node, can discriminate between two messages by the second identification value. In various other embodiments, the forwarded portion of the binding update message of step 1110 was also transmitted with a second identifier; however, the value of the second identifier of step 1110 is the same as the value of second identifier of steps 1126 and 1128. For instance the first node, e.g., tunneling agent node, can discriminate between two messages because they come via different HACNs.

Then in step 1128, the access node transmits said portion of said binding update message and said second identifier from step 1126 to the fourth node. Step 1128 includes sub-step 1130 in which the access node transmits said portion of said binding update message to said fourth node.

Returning to step 1134, in step 1134 the access terminal transmits a message to one of the second node, fourth node and another node, said transmitted message including performance information corresponding to stored performance information. Operation proceeds from step 1134 to step 1136. In step 1136 the access node receives a message including updated mapping information, said updated mapping information including at least one of a second node identifier and a standby node identifier corresponding to a standby node to be used in place of said fourth node with respect to processing of binding update messages including said mobile node address.

Figure 12:
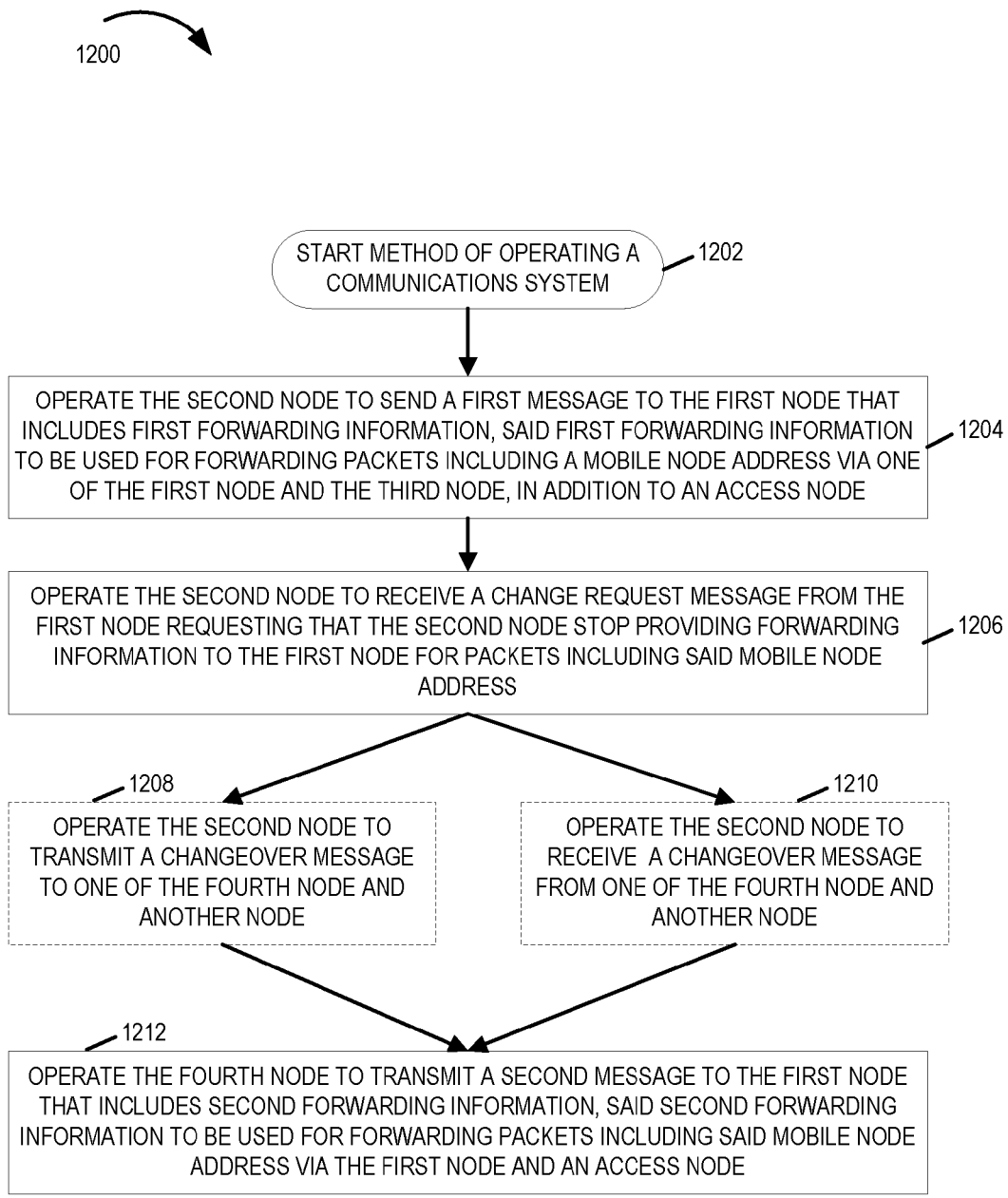
FIG. 12 is a flowchart of an exemplary method of operating a communications system in accordance with various embodiments.

FIG. 12 is a flowchart 1200 of an exemplary method of operating a communications system in accordance with various embodiments. The exemplary communications system includes a first node, e.g., a first home agent tunneling node (HATN), a second node, e.g., a first home agent control node (HACN), a third node, e.g., a second home agent tunneling node (HATN), a fourth node, e.g., a second home agent control node (HACN), and an access node. In various embodiments, the communications system also includes another node which is involved in the exemplary method.

Operation of the exemplary method starts in step 1202, where the various nodes of the system are powered on and initialized and proceeds to step 1204. In step 1204, the second node, is operated to send a first message to the first node that includes first forwarding information to be used for forwarding packets including a mobile node address via one of the first node, and the third node, in addition to an access node. Operation proceeds from step 1204 to step 1206. In step 1206, the second node is operated to receives a change request message from the first node requesting that the second node stop providing forwarding information to the first node for packets including said mobile node address.

Operation proceeds from step 1206 to step 1208 or to alternative step 1210. In step 1208 the second node is operated to transmit a changeover request message to one of the fourth node and the another node. In step 1210 the second node is operated to receive a changeover message from one of the fourth node and another node. Operation proceeds from step 1208 or step 1210 to step 1212.

In step 1212 the fourth node is operated to transmit a second message to the first node that includes second forwarding information, said second forwarding information to be used for forwarding packets including said mobile node address via the first node and an access node. In various embodiments, the first and second forwarding information includes the same forwarding address.

Figure 13:
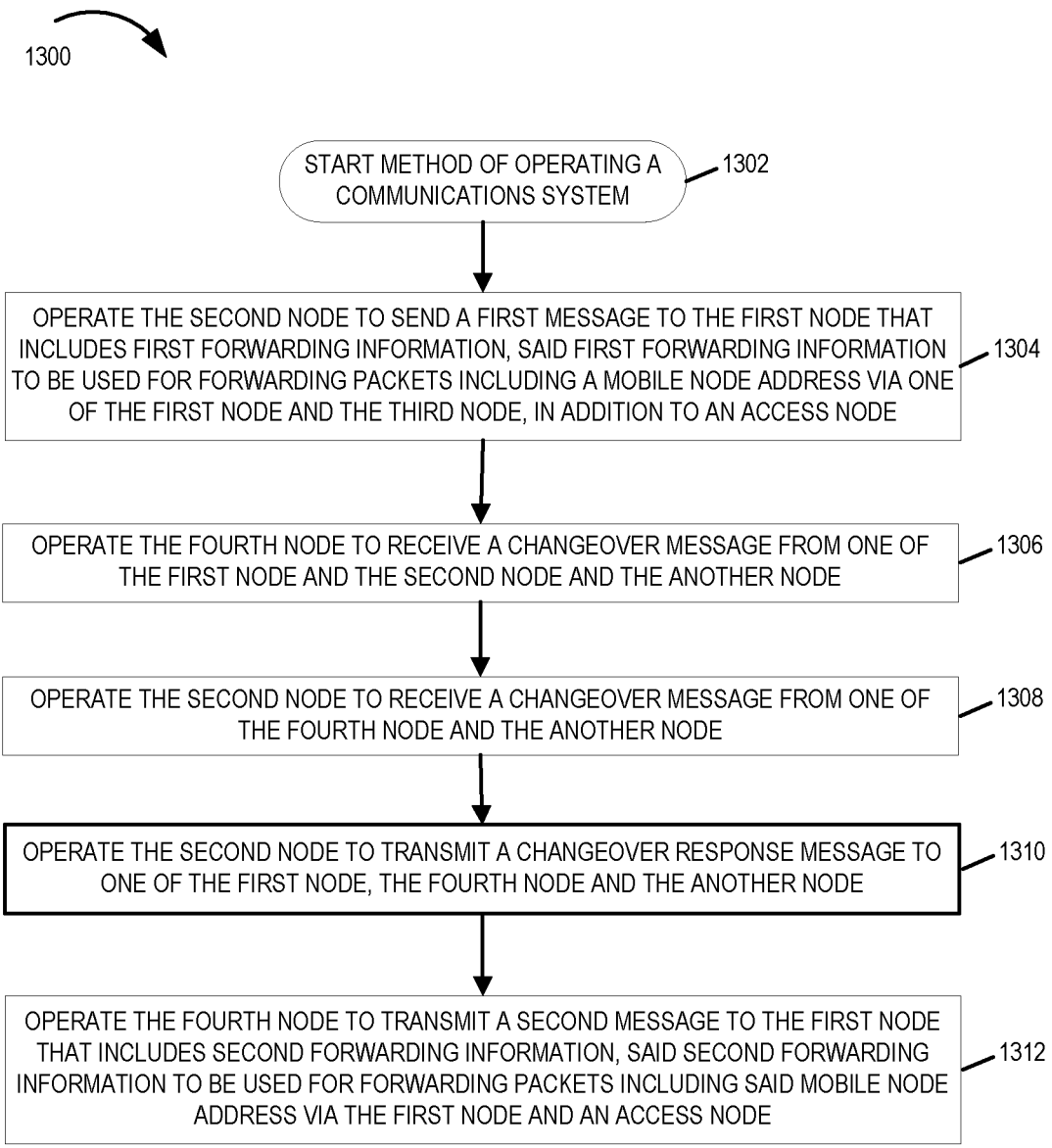
FIG. 13 is a flowchart of an exemplary method of operating a communications system in accordance with various embodiments.

FIG. 13 is a flowchart 1300 of an exemplary method of operating a communications system in accordance with various embodiments. The exemplary communications system includes a first node, e.g., a first home agent tunneling node (HATN) node, a second node, e.g., a first home agent control node (HACN), a third node, e.g., a second home agent tunneling node (HATN), a fourth node, e.g., a second home agent control node (HACN) node, an access node, and another node (HADN).

Operation of the exemplary method starts in step 1302, where the various nodes of the system are powered on and initialized and proceeds to step 1304. In step 1304, the second node, is operated to send a first message to the first node that includes first forwarding information to be used for forwarding packets including a mobile node address via one of the first node and the third node, in addition to an access node.

Operation proceeds from step 1304 to step 1306. In step 1306, the fourth node is operated to receive a changeover message from one of the first node, the second node and the another node (HADN).

Operation proceeds from step 1306 to step 1308. In step 1308 the second node is operated to receive a changeover message from one of the fourth node and the another node. Operation proceeds from step 1308 to step 1310. In step 1310 the second node is operated to transmit a changeover response message to one of the first node, the fourth node and the another node.

Operation proceeds from step 1310 to step 1312. In step 1312 the fourth node is operated to transmit a second message to the first node that includes second forwarding information, said second forwarding information to be used for forwarding packets including said mobile node address via the first node and an access node. In various embodiments, the first and second forwarding information includes different forwarding addresses.

Figure 14:
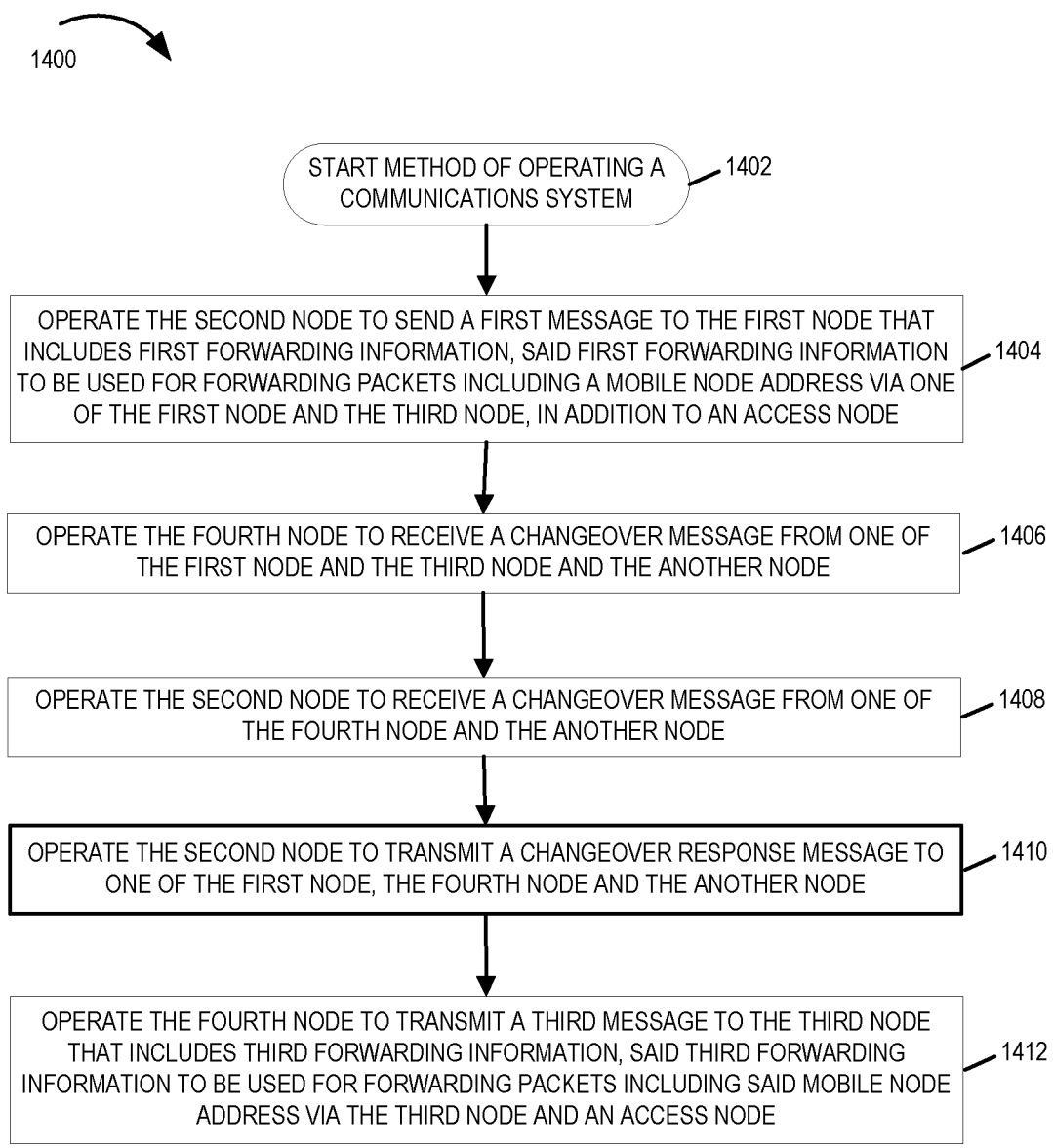
FIG. 14 is a flowchart of an exemplary method of operating a communications system in accordance with various embodiments.

FIG. 14 is a flowchart 1400 of an exemplary method of operating a communications system in accordance with various embodiments. The exemplary communications system includes a first node, e.g., a first home agent tunneling node (HATN) node, a second node, e.g., a first home agent control node (HACN) node, a third node, e.g., a second home agent tunneling node (HATN), a fourth node, e.g., a second home agent control node (HACN), an access node, and another node (HADN).

Operation of the exemplary method starts in step 1402, where the various nodes of the system are powered on and initialized and proceeds to step 1404. In step 1404, the second node, is operated to send a first message to the first node that includes first forwarding information, said first forwarding information to be used for forwarding packets including a mobile node address via one of the first node and the third node, in addition to an access node. Operation proceeds from step 1404 to step 1406. In step 1406, the fourth node is operated to receive a changeover message from one of the first node, the third node and the another node.

Operation proceeds from step 1406 to step 1408. In step 1408 the second node is operated to receive a changeover message from one of the fourth node and the another node. Operation proceeds from step 1408 to step 1410. In step 1410 the second node is operated to transmit a changeover response message to one of the first node, the fourth node and the another node.

Operation proceeds from step 1410 to step 1412. In step 1412 the fourth node is operated to transmit a third message to the third node that includes third forwarding information, said third forwarding information to be used for forwarding packets including said mobile node address via the third node and access node.

Figure 15:
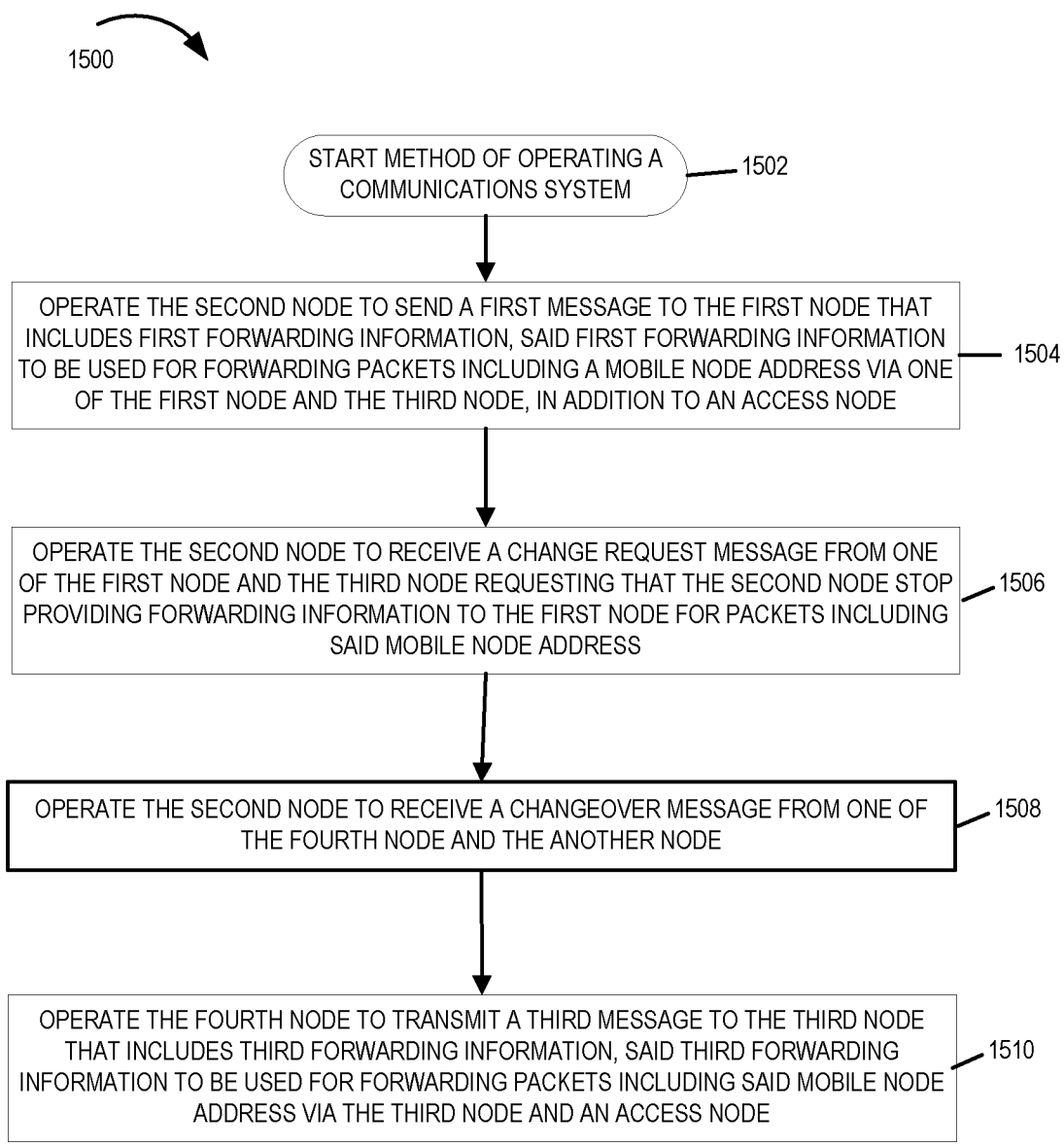
FIG. 15 is a flowchart of an exemplary method of operating a communications system in accordance with various embodiments.

FIG. 15 is a flowchart 1500 of an exemplary method of operating a communications system in accordance with various embodiments. The exemplary communications system includes a first node, e.g., a first home agent tunneling node (HATN), a second node, e.g., a first home agent control node (HACN), a third node, e.g., a second home agent tunneling node (TA), a fourth node, e.g., a second home agent control node (HACN), and an access node. In various embodiments, the communications system also includes another node (HADN) which is involved in the exemplary method.

Operation of the exemplary method starts in step 1502, where the various nodes are powered on and initialized and proceeds to step 1504. In step 1504, the second node is operated to send a first message to the first node that includes first forwarding information, said first forwarding information to be used for forwarding packets including a mobile node address via one of the first node and the third node, in addition to an access node. Operation proceeds from step 1504 to step 1506.

In step 1506, the second node is operated to receive a change request message from one of the first node and the third node requesting that the second node stop providing forwarding information to the first node for packets including said mobile node address. Operation proceeds from step 1506 to step 1508.

In step 1508 the second node is operated to receive a changeover message from one of the fourth node and the another node. Operation proceeds from step 1508 to step 1510. In step 1510 the fourth node is operated to transmit a third message to the third node that includes third forwarding information, said third forwarding information to be used for forwarding packets including said mobile node address via the third node and an access node.

Figure 16:
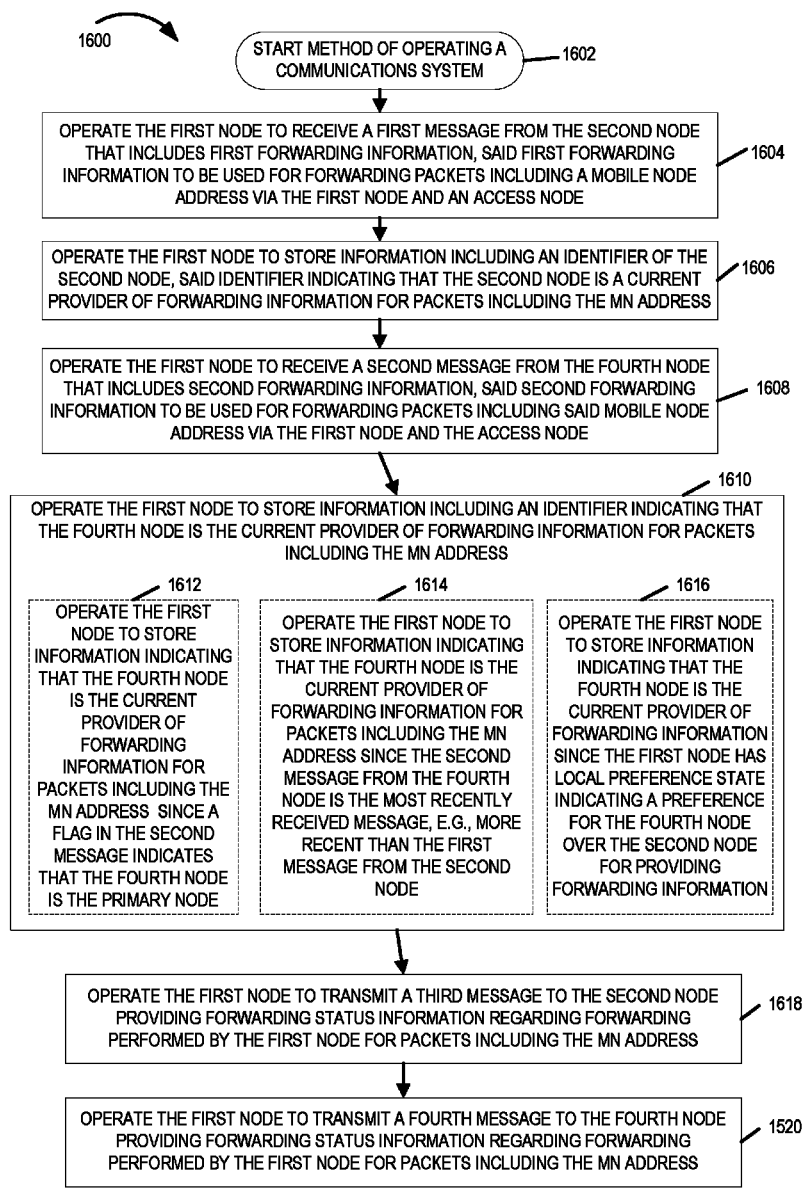
FIG. 16 is a flowchart of an exemplary method of operating a communications system in accordance with various embodiments.

FIG. 16 is a flowchart 1600 of an exemplary method of operating a communications system in accordance with various embodiments. The exemplary communications system includes a first node, e.g., a first home agent tunneling node (HATN), a second node, e.g., a first home agent control node (HACN), a fourth node, e.g., a second home agent control node (HACN), and an access node, e.g., an access node including a mobile IP foreign agent. Operation of the exemplary method starts in step 1602 where the nodes are powered on and initialized and proceeds to step 1604.

In step 1604 the first node is operated to receive a first message from the second node that includes first forwarding information, said first forwarding information to be used for forwarding packets including a mobile node address via the first node and an access node.

Then in step 1566 the first node is operated to store information including an identifier of the second node, said identifier indicating that the second node is a current provider of forwarding information for packets including the MN address. Operation proceeds from step 1606 to step 1608.

In step 1608 the first node is operated to receive a second message from the fourth node that includes second forwarding information, said second forwarding information to be used for forwarding packets including said mobile node address via the first node and the access node. In some embodiments, the first forwarding information is a first binding between the mobile node address and a forwarding address and the second forwarding information is a second binding between the mobile node address and the same forwarding address. In some other embodiments, the first forwarding information is a first binding between the mobile node address and a forwarding address and the second forwarding information is a second binding between the mobile node address and a different forwarding address.

Then, in step 1610 the first node is operated to store information including an identifier indicating that the fourth node is the current provider of forwarding information for packets including the MN address. In various embodiments, step 1610 includes one of sub-steps 1612, 1614 and 1616.

In some embodiments, the second message includes a flag used to indicate one of a primary and secondary node status. In sub-step 1612 the first node is operated to store information indicating that the fourth node is the current provider of forwarding information for packets including the MN address since a flag in the second message indicated that the fourth node is the primary node.

In some embodiments, the first node maintains information indicating which one of the second and fourth nodes is the current provider of forwarding information for packets including the MN address. In sub-step 1616, the first node is operated to store information indicating that fourth node is the current provider of forwarding information for packets including the MN address since the second message from the fourth node is the most recently received message, e.g., more recent than the first message from the second node. In sub-step 1616, the first node is operated to store information indicating that the fourth node is the current provider of forwarding information since the first node has local preference state indicating a preference for the fourth node over the second node for providing forwarding information.

Operation proceeds from step 1610 to step 1618. In step 1618 the first node is operated to transmit a third message to the second node providing forwarding status information regarding forwarding performed by the first node for packets included in the MN address. Operation proceeds from step 1618 to step 1620. In step 1620 the first node is operated to transmit a fourth message to the fourth node providing forwarding status information regarding forwarding performed by the first node for packets including the MN address.

Figure 17:
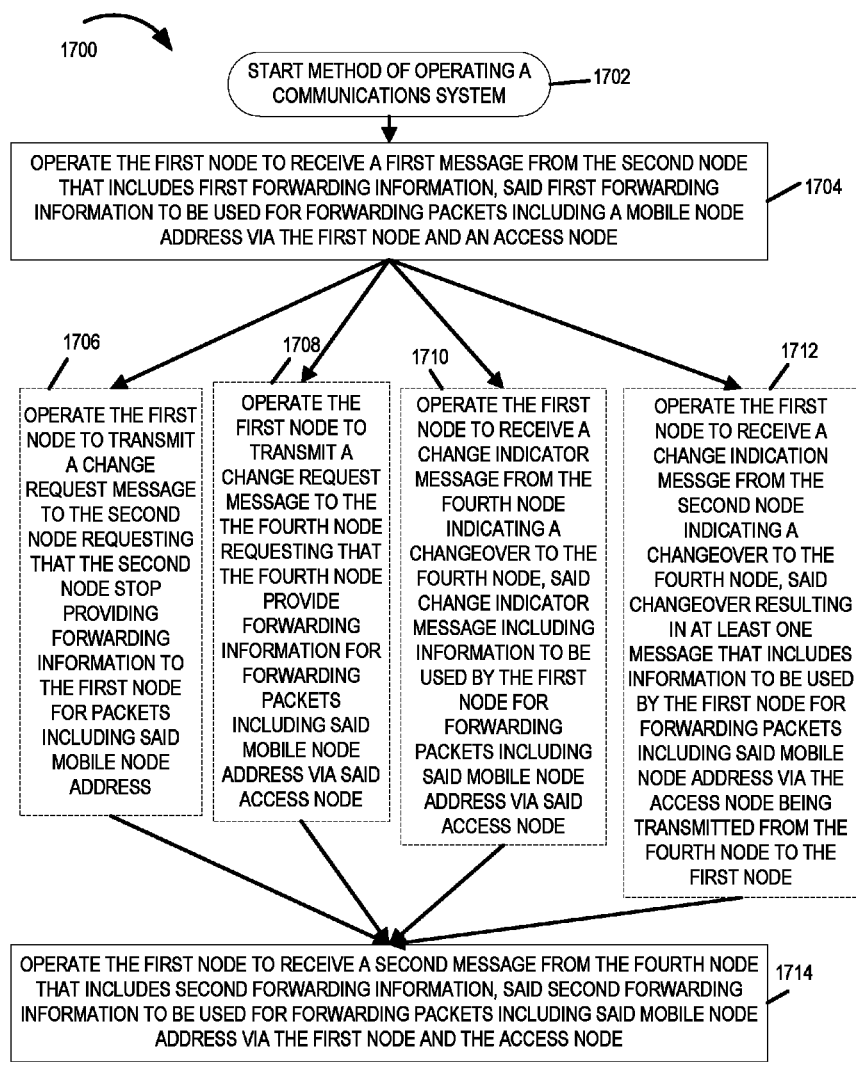
FIG. 17 is a flowchart of an exemplary method of operating a communications system in accordance with various embodiments.

FIG. 17 is a flowchart 1700 of an exemplary method of operating a communications system in accordance with various embodiments. The exemplary communications system includes a first node, e.g., a first home agent tunneling node (HATN), a second node, e.g., a first home agent control node (HACN), a third node, e.g., a second home agent tunneling node (HATN), a fourth node, e.g., a second home agent control node(HACN), and an access node. In various embodiments, the communications system also includes another node (HADN) which is involved in the exemplary method.

Operation of the exemplary method starts in step 1702, where the various nodes are powered on and initialized and proceeds to step 1704. In step 1704, the first node is operated to receive a first message from the second node that includes first forwarding information, said first forwarding information to be used for forwarding packets including a mobile node address via the first node and an access node. Operation proceeds from step 1704 to one or more of steps 1706, 1708, 1710 and 1720.

In step 1706 the first node is operated to transmit a change request message to the second node requesting that the second node stop providing forwarding information to the first node for packing including said mobile node address. In step 1708 the first node is operated to transmit a change request message to the fourth node requesting that the fourth node provide forwarding information for forwarding packets including said mobile node address via the access node. In step 1710 the first node is operated to receive a change indicator message from the fourth node indicating a changeover to the fourth node, said change indicator message including information to be used by the first node for forwarding packets including said mobile node address via said access node. In step 1712 the first node is operated to receive a change indication message from the second node indicating a changeover to the fourth node, said changeover resulting in at least one message that includes information to be used by the first node for forwarding packets including said mobile node address via the access node being transmitted from the fourth node to the first node.

Operation proceeds from one or more of steps 1706, 1708, 1710 and 1712 to step 1714. In step 1714, the first node is operated to receive a second message from the fourth node that includes second forwarding information, said second forwarding information to be used for forwarding packets including said mobile node address via the first node and the access node.

Figure 18:
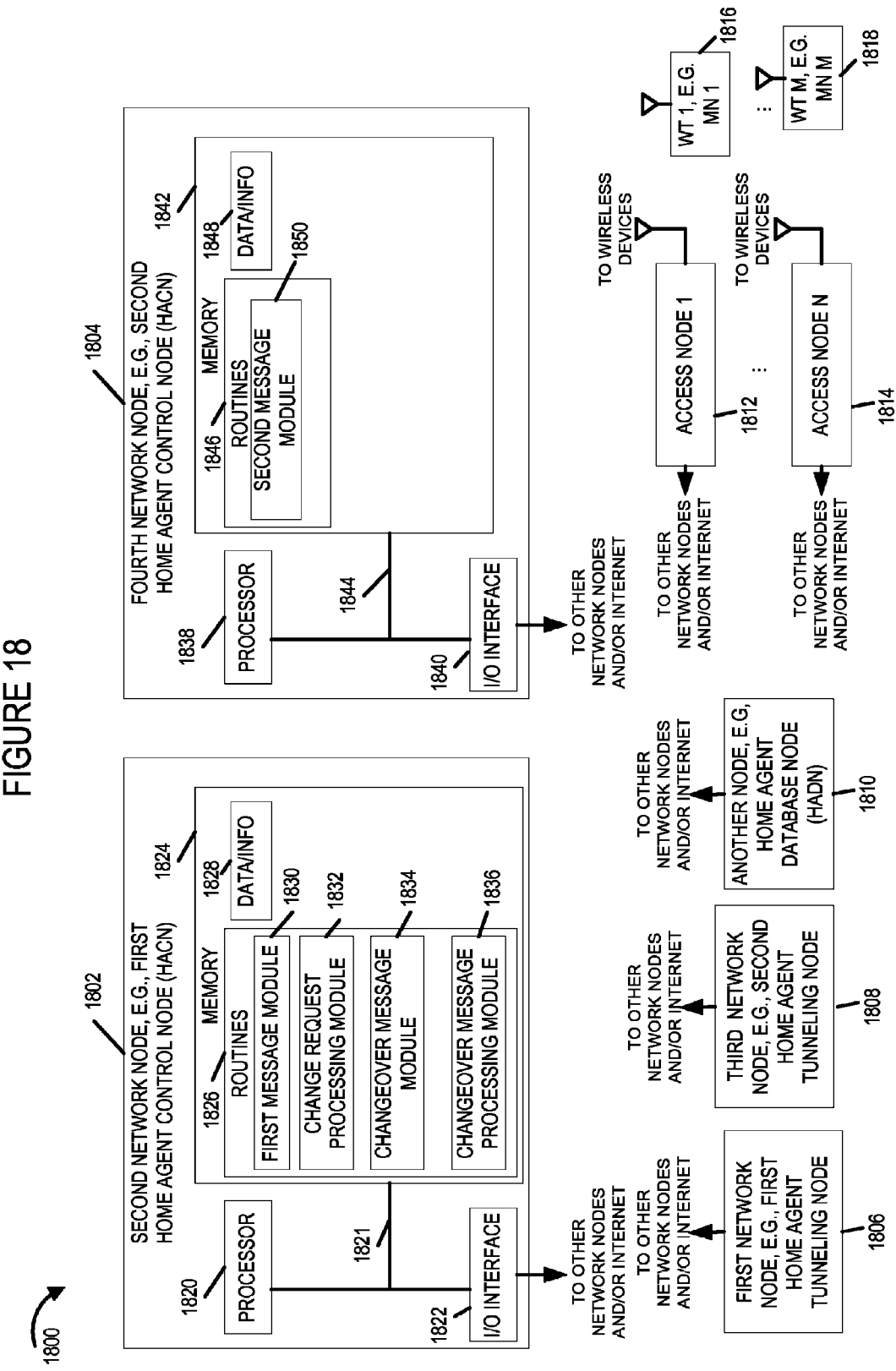
FIG. 18 is a drawing of an exemplary communications system in accordance with various embodiments.

FIG. 18 is a drawing of an exemplary communications system 1800 in accordance with various embodiments. Exemplary communications system 1800 includes a second node 1802, e.g., a first home agent control node (HACN), a fourth node 1804, e.g., a second home agent control node (HACN), a first node 1806, e.g., a first home agent tunneling node (HATN), a third node 1808, e.g., a second home agent tunneling node (HATN), an another node 1810, e.g., a home agent database node (HADN), a plurality of access nodes (access node 1 1812, . . . , access node N 1814), and a plurality of wireless terminals (WT 1 1816, e.g., MN 1, . . . , WT M 1818, e.g., MN M). The second node 1802, fourth node 1804, first node 1806, third node 1808, another node 1810, and access nodes (1812, . . . , 1814) are coupled together via a backhaul network. The wireless terminals (1816, . . . , 1818) may be, and sometimes are, coupled to an access node (1812, . . . , 1814) via a wireless link. In some embodiments, nodes (1802, 1804, 1806, 1808, 1810, 1812, 1814, 1816, 1818) are nodes (120, 140, 110, 130, 180, 170, 170', 160, 150), respectively, described with respect to other figures.

Second node 1802 includes a processor 1820, an I/O interface 1822 and memory 1824 coupled together via a bus 1821 over which the various elements may interchange data and information. Memory 1824 includes routines 1826 and data/information 1828. The processor 1820, e.g., a CPU, executes the routines 1826 and uses the data/information 1828 in memory 1824 to control the operation of the second network node 1802 and implement methods, e.g., a portion of a method of flowchart 1200 of FIG. 12 and/or a portion of a method described with respect to FIG. 7. Routines 1826 include a first message module 1830, a change request processing module 1832, a changeover message module 1834 and a changeover message processing module 1836.

I/O interface 1822 couples the second network node 1802 to other network nodes and/or the Internet. Messages are exchanged between node 1802 and other network nodes via I/O interface 1822. First message processing module 1830 is for generating and sending a first message to the first network node 1806, e.g., first HATN, wherein the first message includes first forwarding information, said first forwarding information to be used for forwarding packets including a mobile node address via one of the first network node 1806, e.g., first HATN, and the third network node 1808, e.g., second HATN, in addition to an access node, e.g., node 1812. The first message is, e.g., a first forwarding information message from the first HACN 1802 to the first HATN 1806. Change request processing module 1832 is for processing a received change request message from the first node 1806, e.g., first HATN) requesting that the second node 1802, e.g., first HACN, stop providing forwarding information to the first network node 1806, e.g., first HATN, for packets including a mobile node address. Changeover message module 1834 is for generating and sending a changeover message to one of the fourth node 1804, e.g., second HACN, and the another node 1810, e.g., HADN, prior to the fourth node 1804 sending the second message to the first node 1806. Changeover message processing module 1836 is processing a changeover message from one of the fourth node 1804, e.g., second HACN, and the another node 1810, e.g. HADN, prior to the fourth node transmitting the second message to the first node 1806.

Fourth node 1804 includes a processor 1838, an I/O interface 1840 and memory 1842 coupled together via a bus 1844 over which the various elements may interchange data and information. Memory 1842 includes routines 1846 and data/information 1848. The processor 1840, e.g., a CPU, executes the routines 1846 and uses the data/information 1848 in memory 1842 to control the operation of the fourth network node 1804 and implement methods, e.g., a portion of a method of flowchart 1200 of FIG. 12 and/or a portion of a method described with respect to FIG. 7. Routines 1426 include a second message module 1850.

I/O interface 1840 couples the second network node 1804 to other network nodes and/or the Internet. Messages are exchanged between node 1804 and other network nodes via I/O interface 1840. Second message processing module 1850 is for generating and sending a second forwarding information message to the first network node 1806, e.g., first HATN, wherein the second forwarding information message includes second forwarding information, said second forwarding information to be used for forwarding packets includes a mobile node address via the first node 1808, e.g., first HATN, and an access node. The second forwarding information message is, e.g., a message from the fourth node 1804, e.g., second HACN, to the first HATN 1806.

Figure 19:
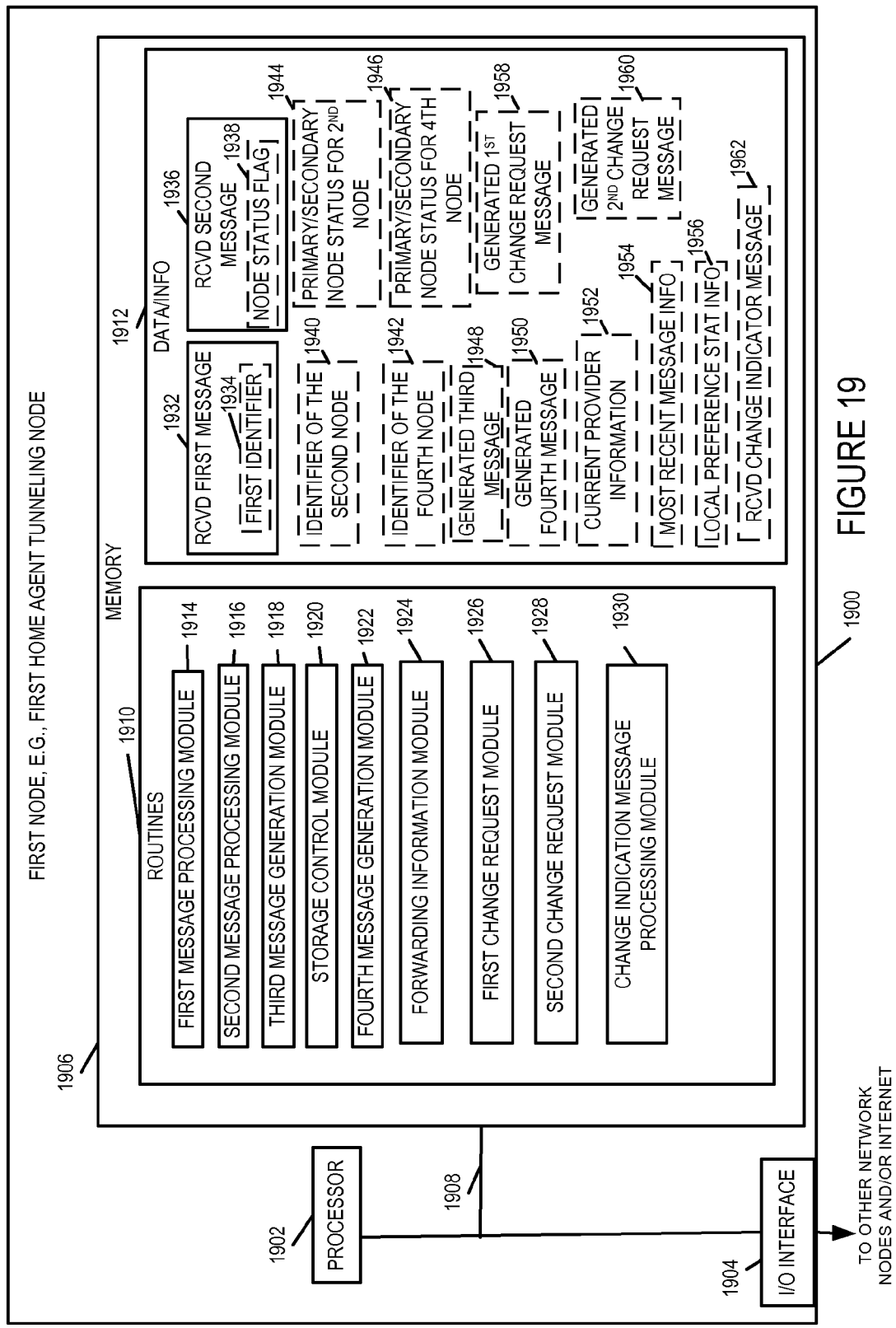
FIG. 19 is drawing of an exemplary first node, e.g., an exemplary first home agent tunneling node, in accordance with various embodiments.

FIG. 19 is drawing of an exemplary first node 1900, e.g., an exemplary first home agent tunneling node, in accordance with various embodiments. Exemplary first node 1900 is for use in a communications system including first node 1900, a second node, e.g., a first HACN, a fourth node, e.g., a second HACN, and an access node. First node 1900 is, in some embodiments, first node 110 described with respect to other figures.

First node 1900, e.g., a first home agent tunneling node, includes a processor 1902, an I/O interface 1904 and memory 1906 coupled together via a bus 1908 over which the various elements may interchange data and information. I/O interface 1904 couples the first node 1900 to other network nodes, e.g. a first HACN, a second HACN, an access node, and another node, e.g., a HADN, via which the first node can send and receive messages.

Memory 1906 includes routines 1910 and data/information 1912. The processor 1902, e.g., a CPU, executes the routines 1910 and uses the data/information 1912 in memory 1906 to control the operation of the first node 1900 and implement methods, e.g., a method in accordance with flowchart 1600 of FIG. 16 or a method in accordance with flowchart 1700 of FIG. 17 or a method in accordance with FIG. 4.

Routines 1910 include a first message processing module 1914, a second message processing module 1916, a third message generation module 1918, a storage control module 1920, a fourth message generation module 1922, a forwarding information module 1924, a first change request module 1926, a second change request module 1928, and a change indication message processing module 1930.

Data/information 1912 includes received first message 1932 which is processed by module 1914 and received second message 1936 which is processed by module 1916. In some embodiments, the received first message 1932 includes a first identifier 1934, and the first identifier had been transmitted in a message by a mobile having the mobile node address. In some embodiments, the received second message 1936 includes a node status flag 1938, used to indicate one of a primary and secondary status, e.g., for one or more HACNs such as for the fourth node. Data/information 1912, in some embodiments, includes primary/secondary status information for the $2^{nd}$ node 1944, e.g., information indicating whether the $2^{nd}$ node, e.g., first HACN is currently considered the primary or secondary HACN, and primary/secondary $4^{th}$ node status information 1946, e.g., information indicating whether the fourth node, e.g., $2^{nd}$ HACN is currently considered the primary or secondary HACN, e.g., of a pair of HACN as part of redundancy and/or fault management.

In some embodiments, data/information 1912 includes an identifier of the second node 1940, e.g., an identifier of the first HACN, or an identifier of the fourth node 1942, e.g., an identifier of the second HACN. For example the stored identifier indicates which node is the current provider of forwarding information for packets including the MN address.

In various embodiments, data/information 1912 includes one or more of: a generated third message 1948, a generated fourth message 1950, a generated first change request message 1958, a generated second change request message 1960, current provider information 1952, most recent message information 1954, local preference state information 1956, and a received change indicator message 1962.

First message processing module 1914 is for receiving and processing a first message from the second node, e.g., first HACN, that includes first forwarding information, said first forwarding information to be used for forwarding packets including a mobile node address via the first node 1900, e.g., first HATN, and an access node. Second message processing module 1916 is for receiving and processing a second message from the fourth node, e.g., second HACN, the second message including second forwarding information, the second forwarding information to be used for forwarding packets including said mobile node address via the first node 1900, e.g., first HATN, and the access node.

In various embodiments, the access node includes a mobile IP foreign agent. In some embodiments, the first forwarding information is a first binding between the mobile node address and a forwarding address, and the second forwarding information is a second binding between the mobile node address and the same forwarding address. In some embodiments, the first forwarding information is a first binding between the mobile node address and a forwarding address, and the second forwarding information is a second binding between the mobile node address and a different forwarding address.

Storage control module 1920 controls the storage of information including, at times, information including an identifier of the second node, said identifier indicating that the second node, e.g., first HACN, is the current provider of forwarding information for packets including the MN address. Identifier of the second node 1940 is such an exemplary identifier, and it may have been stored by storage control module 1920 prior to receiving the second message. Third message generation module 1918 is for generating a third message directed to the second node, e.g., first HACN, the third message providing forwarding status information regarding forwarding performed by the first node for packets including the MN address.

Storage control module 1920 controls storage of information including, at times, an identifier indicating that the fourth node, e.g., second HACN, is the current provider of forwarding information for packets including the MN address, the identifier being obtained from the received second message. Identifier of the fourth node 1942 is such an exemplary identifier. Fourth message generation module 1922 generates a fourth message directed to the fourth node, e.g., second HACN, the fourth message providing forwarding status information regarding forwarding performed by the first node 1900, e.g., first HATN, for packets including the MN address.

In various embodiments, the second message includes a flag used to indicate one of a primary and a secondary node status. Forwarding information module 1924 indicates that the fourth node is the current provider of forwarding information when the flag indicates that the fourth node is the primary node.

In various embodiments, the first node maintains information indicating which one of the second node, e.g., first HACN, and the fourth node, e.g., second HACN, is the current provider of forwarding information for packets including the MN address. In some such embodiments, the storage control module 1920 control the memory to store information indicating which one of the second and the fourth node is the current provider of forwarding information for packets including the MN address. For example, the storage control module 1920 control the memory to store information indicating that the fourth node is the current provider when one of: (i) the second message is the most recently received message, (ii) the first node 1900, e.g., first HATN, has local preference state indicating a preference for the fourth node, e.g., second HACN, over the second node, e.g., first HACN, for providing forwarding information.

First change request module 1926 is for generating a change request message directed to the second node, e.g., first HACN, prior to receiving a second message, the change request message requesting that the second node, e.g., first HACN, stop providing forwarding information to the first node 1900, e.g., first HATN, for packets including the MN address. Second change request module 1928 is for generating a change request message directed to the fourth node, e.g. second HACN, prior to receiving the second message, the change request message requesting that the fourth node provide forwarding information for packets including said mobile node address.

Change indication message processing module 1930, in some embodiments, processes a change indication message received from the fourth node, e.g. second HACN, the change indication message including information to be used by the first node 1900, e.g., first HATN, for forwarding packets including the mobile node address via the access and indicating a changeover to the fourth node, e.g., second HACN. For example, the changeover is from the second node, e.g., first HACN to the fourth node, e.g., second HACN.

Changeover indication message processing module 1930, in some embodiments, processes a change indicator message from the second node, e.g. first HACN, indicating a changeover to the fourth node, e.g., second HACN, said changeover resulting in at least one message that includes information to be used by the first node, e.g., first HATN, for forwarding packets including the mobile node address via the access node being transmitted from the fourth node, e.g. second HACN, to the first node, e.g., first HATN.

Figure 20:
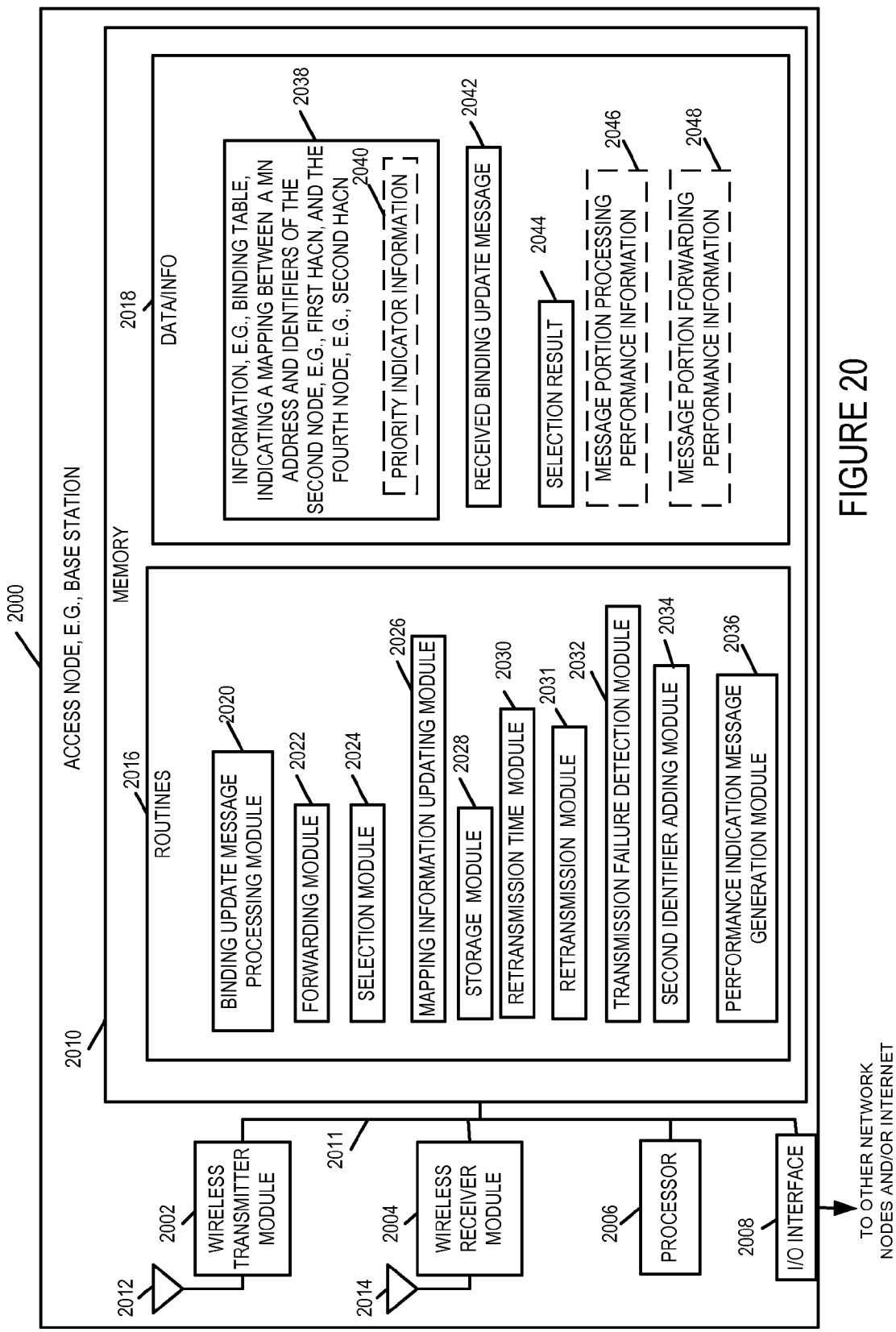
FIG. 20 is a drawing of an exemplary access node, e.g., base station, in accordance with various embodiments.

FIG. 20 is a drawing of an exemplary access node 2000, e.g., base station, in accordance with various embodiments. The exemplary access node 2000 is for use in a communications system including the access node 2000, a first node, e.g., a first home agent tunneling node (HATN), a second node, e.g., a first home agent control node (HACN), and a fourth node, e.g., a second HACN. In various embodiments, the exemplary communications system further includes another node, e.g., a home agent database node (HADN). In some embodiments, the second and fourth nodes are nodes which process binding update signaling for a binding between a mobile node address and a forwarding address used by the first node to forward packets including the mobile node address. Access node 2000 is, in some embodiments, access node 170 or 170' described with respect to other figures.

Access node 2000 includes a wireless transmitter module 2002, a wireless receiver module 2004, a processor 2006, an I/O interface 2008 and a memory 2010 coupled together via a bus 2011 over which the various elements may interchange data and information. Wireless transmitter module 2002, e.g., e.g., an OFDM, CDMA, or GSM transmitter, is coupled to transmit antenna 2012 via which the access node transmits downlink signals to wireless terminals, e.g., mobile nodes. Wireless receiver module 2004, e.g., an OFDM, CDMA, or GSM receiver, is coupled to receive antenna 2014 via which the access node 2000 receives uplink signals from wireless terminals, e.g., mobile nodes. In some embodiments, the same antenna is used for transmitter and receiver.

I/O interface 2008 couples the access node 2000 to other network nodes, e.g., other access nodes, a first node such as a first HATN, a third node such as a second HATN, a second node such as a first HACN, a fourth node such as a second HACN and another node such as a HADN. I/O interface 2008 allows a wirlesss terminal using an attachment point of access node 2000 to communicate with a peer node which is using an attachment point of a different access node.

Memory 2010 includes routines 2016 and data/information 2108. The processor 2006, e.g., a CPU, executes the routines 2016 and uses the data/information 2018 in memory 2010 to control the operation of the access terminal 2000 and implement methods, e.g., a method in accordance with the flowchart 1100 of FIG. 11. Routines 2016 include a binding update message processing module 2020, a forwarding module 2022, a selection module 2024, a mapping information updating module 2026, a storage module 2028, a retransmission time module 2030, a retransmission module 2031, a transmission failure detection module 2032, a second identifier adding module 2034, and a performance indication message generation module 2036. Data/information 2018 includes information indicating a mapping between a MN address and identifiers of the second node, e.g., first HACN, and the fourth node, e.g., second HACN, 2038. In various embodiments stored information 2038 is or includes a binding table. In some embodiments, information 2038 includes priority indicator information 2040. Data/information 2018 also includes a received binding update message 2042 and selection result information 2044. In various embodiments, information 2018 includes one or more of message portion processing performance information 2046 and message portion forwarding performance information 2048.

Binding update message processing module 2020 processes received binding update messages, e.g., message 2042, the received binding update message including an MN address and a forwarding address, the forwarding address being used by a first node, e.g., a first home agent tunneling node, to forward packets including the MN address. In various embodiments, the forwarding address is an address of access node 2000 and the access node 2000 includes a Mobile IP foreign agent.

Forwarding module 2022 is for forwarding a portion of the received message, e.g., message 2042, to the second node, e.g., to the first HACN. Selection module 2024 selects between the second and fourth nodes, e.g., between first and second HACN nodes, as the destination of a portion of a received binding update message. In some embodiments, the forwarding module 2022 forwards a portion of the received binding update message to the second node, e.g., first HACN, after the selection module 2024 selects between the second node and fourth node as the destination of said portion of said received binding update message and selects the second node. In some such embodiments, the forwarding module 2022 forwards a portion of the received binding update message to the fourth node, e.g., second HACN, after the selection module selects between the second node and fourth node as the destination of said portion of said received binding update message and selects the fourth node. Selection result information 2044 is an output of the choice of the selection module 2024.

In some embodiments, the selection module 2024 performs the selection operation based on information included in the binding update message. In some such embodiments, at least some of the information including the binding update message is non-address information.

In various embodiments, the selection module 2024 selects the second node rather than the fourth node as the destination for the message based on a priority indicator included in stored mapping information, e.g., priority indicator information 2040 included in mapping information 2038, said priority indicator being associated with at least one of the second and fourth nodes, the priority indicator indicating that the second node has priority over the fourth node.

Mapping information updating module 2026, in some embodiments, processes a mapping updating message including updated mapping information that includes priority information that indicates changes in priority indication information to be made to stored priority information corresponding to at least one of the second and fourth nodes, e.g., first and second HACNs. Mapping information updating module 2026 also updates stored information 2038 based on the content of the received mapping update message. IN some embodiments, the received mapping update message was transmitted by one of: the second node, e.g., first HACN, the fourth node, e.g., second HACN, and the another node, e.g., HADN or AAA node including a home agent database.

Storage module 2028 stores at least one of message portion processing performance information and message portion forwarding performance information regarding at least one previous message portion forwarded by the access node 2000 to one of the second and fourth nodes, e.g., first and second HACNs. Message portion processing performance information 2046 and message portion forwarding performance information 2048 are outputs out storage module 2028. In some such embodiments, the selection module 2024 selects, at times, the second node rather than the fourth node as the destination of the message portion as a function of the stored performance information, e.g., as a function of one or more of message portion processing performance information 2046 and message portion forwarding performance information 2048.

Retransmission time module 2030 executes a retransmit timer associated with a forwarded message portion. Retransmission module 2031, in some embodiments, controls the access node 2000 to retransmit the message portion to the second node, e.g., first HACN, when the retransmit timer expires prior to the reception of a response to a forwarded message portion and when the forwarded message portion was originally forwarded to the second node. Retransmission module 2031, in some embodiments, controls the access node 2000 to retransmit the message portion to the fourth node, e.g., second HACN, when the retransmit timer expires prior to the reception of a response to a forwarded message portion and when the forwarded message portion was originally forwarded to the fourth node.

Transmission failure detection module 2032 performs a second node transmission failure detection operation. Retransmission module 2031, in some embodiments, controls the access node 2000 to transmit a portion of said message portion to the fourth node, e.g., second HACN, when the second node transmission failure detection process indicates a transmission failure.

In various embodiments, the transmission failure detection module 2032 performs a fourth node transmission failure detection operation. Retransmission module 2031, in various embodiments, controls the access node 2000 to transmit a portion of a message portion originally attempted to be communicated to the fourth node, to the second node, when the fourth node transmission failure detection process indicates a transmission failure.

The received binding update message, e.g., message 2042, may, and sometimes does, include a first identifier. Second identifier adding module 2034, in some embodiments, adds a second identifier to a transmitted message portion, the value of the second identifier being different for the transmitted message portion and the retransmitted message portion. For example, the value of the second identifier, in some embodiments, indicates whether the transmitted message portion is a first transmission or is a retransmission.

In some embodiments, the second identifier is different depending upon the node to which the message portion is being communicated. For example, in some embodiments, the second identifier adding module 2034 adds a second identifier to a portion of a received binding update message portion, the value of the second identifier being different when the transmission is to be to the fourth node, e.g., second HACN, as compared to when the transmission is to be to the second node, e.g., first HACN.

In some other embodiments, the second identification module 2034 adds a second identifier to a portion of a message portion of the received binding update message to be transmitted to the fourth node, the value of the second identifier being the same as the value of the second identifier in the transmission of the message portion to the second node. Thus in some embodiments, the value of the second identifier does not change as a function of which HACN the message portion is being communicated to.

Performance indication message generation module 2036 generates a performance indication message directed to one of the second node, e.g., first HACN, fourth node, e.g., second HACN, and another node, e.g., HADN, the performance indication information including performance information corresponding to the stored performance information, e.g., information corresponding to information 2046 and/or 2048.

Mapping information updating module 2026, in some embodiments, processes a mapping information message including updated mapping information, the updated mapping information including at least one of a second node identifier and a standby node identifier, said standby node identifier corresponding to a standby node to be used in place of the fourth node, e.g., second HACN, with respect to processing of binding update messages including the mobile node address.

Various novel embodiments support methods other than IP in IP tunnels for packet redirection between the first or third nodes 110, 130 and the access node 170 or MN 160 said methods including for example, TPv6 routing headers, GRE tunnels, IPSEC tunnels, as well as VPN techniques such as MPLS and switched circuits.

Whilst various exemplary embodiments have been described for MIP based HA Control and Tunnel Nodes and MIP like mobility RREQ/RREP signaling, the novel features, methods and/or apparatus are applicable to other signaling protocols from control nodes like the second and fourth nodes 120,140 which request that a first or third node 110,130 establish forwarding of packets that include a MN address 161 to the Mobile Node 160 via an Access Node 170. Such control and forwarding nodes include the PDSN, GGSN, SGSN, RNC, BS, BSC, MSc in IMT2000, 3GPP and CDMA2000 type networks and there successors. Various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the various embodiments are directed to a machine-readable medium including machine executable instructions for causing a machine, e.g., processor and associated hardware, to perform one or more of the steps of the above-described method(s). Messages which are generated and/or transmitted in accordance with the various embodiments are stored on machine readable medium, e.g., in memory (RAM) in the device generating, transmitting and/or receiving the message or messages. Various embodiments are directed to, among other things, memory storing novel messages.

In some embodiments, the processor or processors, e.g., CPUs, of one or more devices, e.g., communications devices such as access nodes, home agent control nodes or home agent tunneling nodes, are configured to perform the steps of the methods described as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

Numerous additional variations on the methods and apparatus of the various exemplary embodiments described above will be apparent to those skilled in the art in view of the above description. Such variations are to be considered within scope. The methods and apparatus of the various embodiments may be used with CDMA, orthogonal frequency division multiplexing (OFDM), or various other types of communications techniques which may be used to provide wireless communications links between access nodes such as base stations and mobile nodes. Accordingly, in some embodiments base stations establish communications links with mobile nodes using OFDM or CDMA. In various embodiments the mobile nodes are implemented as notebook computers, personal data assistants (PDAs), or other portable devices including receiver/transmitter circuits and logic and/or routines, for implementing the novel methods.

What is claimed is:

1. A method for use in a communications system including an access node, a first node, a second node, a fourth node, and another node, the method comprising operating said access node to perform the steps of:
   storing information indicating a mapping between a mobile node address and identifiers of the second and fourth nodes;
   receiving a binding update message including the mobile node address and a forwarding address, said forwarding address being used by said first node to forward packets including said mobile node address;
   storing at least one of: i) message portion processing performance information or ii) message portion forwarding performance information regarding at least one previous message portion forwarded by said access node to one of said second and fourth nodes;
   selecting between said second and fourth nodes as a destination of a portion of said binding update message;

forwarding said portion of said binding update message to a selected node;

transmitting a message to one of the second node, the fourth node or another node, said transmitted message including performance information corresponding to the stored performance information; and receiving a message including updated mapping information, said updated mapping information including at least one of a second node identifier or a standby node identifier, said standby node identifier corresponding to a standby node to be used in place of said fourth node with respect to processing of binding update messages including said mobile node address.

2. The method of claim 1, wherein said first node is a home agent tunneling node, said second node is a first home agent control node, and the fourth node is a second home agent control node.

3. The method of claim 1, further including:

in advance of receiving a binding update message, operating the access node to transmit a selection message to a mobile node including second node selection information that indicates that the mobile node should transmit binding update messages including the mobile node address towards the second node; and wherein the received binding update message further includes a destination node identifier, said destination node identifier identifying said second node as the destination for said binding update message.

4. The method of claim 1, wherein said forwarding address is an address of said access node and the access node includes a Mobile IP Foreign Agent.

5. The method of claim 1, wherein the second and fourth nodes are nodes which process binding update signaling for a binding between the mobile node address and the forwarding address used by said first node to forward packets including said mobile node address.

6. The method of claim 1, wherein said selecting between said second and fourth nodes is performed as a function of said stored performance information.

7. The method of claim 6, wherein said selection is based on at least some information included in said binding update message.

8. The method of claim 7, wherein said at least some information included in said binding update message is non-address information.

9. The method of claim 6, wherein the access node selects the second node rather than the fourth node as the destination for said message based on a priority indicator included in said stored mapping information, said priority indicator being associated with at least one of the second and fourth nodes, said priority indicator indicating that said second node has priority over said fourth node.

10. The method of claim 9, further comprising:

receiving a message including updated mapping information that includes priority information that indicates changes in priority indication information to be made to stored priority information corresponding to at least one of the second and fourth nodes.

11. The method of claim 10, wherein the received message includes updated mapping information that was transmitted by one of: the second node, the fourth node, and the another node.

12. The method of claim 1, further comprising:

selecting the second node rather than the fourth node as the destination for said message portion as a function of said stored performance information.

13. The method of claim 1, further comprising;

executing a retransmit timer associated with said forwarded message portion of the binding update message; and retransmitting said message portion of the binding update message to the second node when the retransmit timer expires prior to reception of a response to forwarding of said message portion.

14. The method of claim 13, wherein the received binding update message includes a first identifier, the method further comprising:

adding a second identifier to said forwarded message portion of the binding update message, the value of said second identifier being different for said forwarded message portion and said retransmitted message portion.

15. The method of claim 1, further comprising:

executing a second node transmission failure detection process; and transmitting at least a portion of said message portion of the binding update message to the fourth node when the second node transmission failure detection process indicates a transmission failure.

16. The method of claim 15, wherein the received binding update message includes a first identifier, the method further comprising:

adding a second identifier to the portion of said message portion of the binding update message transmitted to said fourth node, the value of said second identifier being different from the value of the second identifier included in the transmission of said message portion to said second node.

17. The method of claim 15, wherein the received binding update message includes a first identifier, the method further comprising:

adding a second identifier to the portion of said message portion of the binding update message transmitted to said fourth node, the value of said second identifier being the same as the value of the second identifier included in the transmission of said message portion to said second node.

18. The method of claim 1, wherein said access node is a base station.

19. The method of claim 18, wherein said second and fourth nodes are home agent control nodes.

20. The method of claim 19, wherein said first node is a home agent tunneling node.

21. An access node for use in a communications system including the access node, a first node, a second node, another node, and a fourth node, the access node comprising:

a memory module storing information indicating a mapping between a mobile node address and identifiers of the second and fourth nodes;

a binding update message processing module configured to process binding update messages including the mobile node address and a forwarding address, said forwarding address being used by said first node to forward packets including said mobile node address;

a storage module storing at least one of: i) message portion processing performance information or ii) message portion forwarding performance information regarding at least one previous message portion forwarded by said access node to one of said second and fourth nodes;

a selection module configured to select between said second and fourth nodes as a destination of a portion of said binding update message;

a forwarding module configured to forward said portion of said binding update message to a selected node; and a performance indication message generation module configured to generate a performance indication message directed to one of the second node, the fourth or another node, said performance indication message including performance information corresponding to the stored performance information; and a mapping information updating module configured to process a mapping information message including updated mapping information, said updated mapping information including at least one of a second node identifier and a standby node identifier, said standby node identifier corresponding to a standby node to be used in place of said fourth node with respect to processing of binding update messages including said mobile node address.

22. The access node of claim 21,
wherein said first node is a home agent tunneling node;
wherein said second node is a home agent control node; and
wherein said fourth node is a second home agent control node.

23. The access node of claim 21, wherein said forwarding address is an address of said access node and the access node includes a Mobile IP Foreign Agent.

24. The access node of claim 21, wherein the second and fourth nodes are nodes which process binding update signaling for a binding between a mobile node address and a forwarding address used by said first node to forward packets including said mobile node address.

25. The access node of claim 21,
wherein said selection module is configured to select between said second and fourth nodes as the destination of said portion of said message base on said stored performance information.

26. The access node of claim 25, wherein said selection module performs said selection operation based on information included in said binding update message.

27. The access node of claim 26, wherein said at least some information included in said binding update message is non-address information.

28. The access node of claim 21, wherein the selection module selects the second node rather than the fourth node as the destination for said message based on a priority indicator included in said stored mapping information, said priority indicator being associated with at least one of the second and fourth nodes, said priority indicator indicating that said second node has priority over said fourth node.

29. The access node of claim 28, further comprising:
a mapping information updating module for processing a mapping update message including updated mapping information that includes priority information that indicates changes in priority indication information to be made to stored priority information corresponding to at least one of the second and fourth nodes and for updating the stored information based on the content of said mapping update message.

30. The access node of claim 29, wherein the received mapping update message including updated mapping information was transmitted by one of: the second node, the fourth node, and the another node.

31. The access node of claim 21,
wherein said selection module selects the second node rather than the fourth node as the destination for said message portion as a function of said stored performance information.

32. The access node of claim 21, further comprising;
a retransmission time module for executing a retransmit timer associated with said forwarded message portion; and
a retransmission module for controlling the access node to retransmit said message portion of the binding update message to the second node when the retransmit timer expires prior to reception of a response to forwarding of said message portion of the binding update message.

33. The access node of claim 32, wherein the received binding update message includes a first identifier, the access node further including:
a second identifier adding module for adding a second identifier to said transmitted message portion of the binding update message, the value of said second identifier being different for said transmitted message portion of the binding update message and said retransmitted message portion of the binding update message.

34. The access node of claim 21, further comprising:
a transmission failure detection module for performing a second node transmission failure detection operation; and
a retransmission module for controlling the access node to transmit a portion of said message portion of the binding update message to the fourth node when the second node transmission failure detection process indicates a transmission failure.

35. The access node of claim 34, wherein the received binding update message includes a first identifier, the access node further comprising:
a second identifier adding module for adding a second identifier to the portion of said message portion of the binding update message transmitted to said fourth node, the value of said second identifier being different from the value of the second identifier included in the transmission of said message portion of the binding update message to said second node.

36. The access node of claim 34, wherein the received binding update message includes a first identifier, the access node further comprising:
a second identifier adding module for adding a second identifier to the portion of said message portion of the binding update message transmitted to said fourth node, the value of said second identifier being the same as the value of the second identifier included in the transmission of said message portion of the binding update message to said second node.

37. The access node of claim 21, wherein said access node is a base station.

38. An access node for use in a communications system including the access node, a first node, a second node, another node, and a fourth node, the access node comprising:
means for storing information indicating a mapping between a mobile node address and identifiers of the second and fourth nodes;
binding update message processing means for processing received binding update messages including the mobile node address and a forwarding address, said forwarding address being used by said first node to forward packets including said mobile node address;
means for storing at least one of: i) message portion processing performance information or ii) message portion forwarding performance information regarding at least one previous message portion forwarded by said access node to one of said second and fourth nodes;

means for selecting between said second and fourth nodes as a destination of a portion of said binding update message;
forwarding means for forwarding said portion of said binding update message to a selected node;
means for transmitting a message to one of the second node, the fourth node or another node, said transmitted message including performance information corresponding to the stored performance information; and
means for receiving a message including updated mapping information, said updated mapping information including at least one of a second node identifier or a standby node identifier, said standby node identifier corresponding to a standby node to be used in place of said fourth node with respect to processing of binding update messages including said mobile node address.

39. The access node of claim 38,
wherein said first node is a home agent tunneling node;
wherein said second node is a home agent control node;
wherein said fourth node is a second home agent control node.

40. The access node of claim 38, wherein said forwarding address is an address of said access node and the access node includes a Mobile IP Foreign Agent.

41. The access node of claim 38, wherein said access node is a base station.

42. A non-transitory computer readable medium embodying machine executable which when executed control an access node in a communications system including the access node, a first node, a second node, another node, and a fourth node, to perform the steps of:
storing information indicating a mapping between a mobile node address and identifiers of the second and fourth nodes;
receiving a binding update message including the mobile node address and a forwarding address, said forwarding address being used by said first node to forward packets including said mobile node address;
storing at least one of: i) message portion processing performance information or ii) message portion forwarding performance information regarding at least one previous message portion forwarded by said access node to one of said second and fourth nodes;
selecting between said second and fourth nodes as a destination of a portion of said binding update message;
forwarding said portion of said binding update message to a selected node;
transmitting a message to one of the second node, the fourth node or another node, said transmitted message including performance information corresponding to the stored performance information; and
receiving a message including updated mapping formation, said updated mapping information including at least one of a second node identifier or a standby node identifier, said standby node identifier corresponding to a standby node to be used in place of said fourth node with respect to processing of binding update messages including said mobile node address.

43. The non-transitory computer readable medium of claim 42, wherein said first node is a home agent tunneling node, said second node is a first home agent control node, and the fourth node is a second home agent control node.

44. The non-transitory computer readable medium of claim 42, wherein said access node is a base station.

45. An apparatus for use in an access node in a communications system including the access node, a first node, a second node, another node, and a fourth node, the apparatus comprising:
a processor configured to implement a method of controlling said access node to implement a method, the method comprising:
storing information indicating a mapping between a mobile node address and identifiers of the second and fourth nodes;
receiving a binding update message including the mobile node address and a forwarding address, said forwarding address being used by said first node to forward packets including said mobile node address;
storing at least one of: i) message portion processing performance information or ii) message portion forwarding performance information regarding at least one previous message portion forwarded by said access node to one of said second and fourth nodes;
selecting between said second and fourth nodes as a destination of a portion of said binding update message;
forwarding said portion of said binding update message to a selected node;
transmitting a message to one of the second node the fourth node or another node, said transmitted message including performance information corresponding to the stored performance information; and
receiving a message including updated mapping information, said updated mapping information including at least one of a second node identifier or a standby node identifier, said standby node identifier corresponding to a standby node to be used in place of said fourth node with respect to processing of binding update messages including said mobile node address.

46. The apparatus of claim 45, wherein said first node is a home agent tunneling node, said second node is a home agent control node, and the fourth node is a second home agent control node.

47. The apparatus of claim 45, wherein said access node is a base station.

* * * * *